United States Patent [19]

Ohmori et al.

[11] Patent Number: 5,666,249
[45] Date of Patent: Sep. 9, 1997

[54] MAGNETIC HEAD AND METHOD FOR MANUFACTURE THEREOF

[75] Inventors: Hiroyuki Ohmori; Tetsuya Yamamoto, both of Kanagawa; Yasunari Sugiyama, Tokyo, all of Japan

[73] Assignee: Sony Corporation, Tokyo, Japan

[21] Appl. No.: 640,987

[22] Filed: Apr. 22, 1996

Related U.S. Application Data

[63] Continuation of Ser. No. 202,151, Feb. 25, 1994, abandoned.

[30] Foreign Application Priority Data

| Mar. 2, 1993 | [JP] | Japan | ................................ 5-066155 |
| Mar. 30, 1993 | [JP] | Japan | ................................ 5-072117 |

[51] Int. Cl.$^6$ .................................................. G11B 5/17
[52] U.S. Cl. ................................................. 360/123
[58] Field of Search ................................... 360/121, 123, 360/126

[56] References Cited

U.S. PATENT DOCUMENTS

| 4,860,140 | 8/1989 | Momata et al. | 360/127 |
| 4,901,178 | 2/1990 | Kobayashi et al. | 360/126 |
| 5,047,885 | 9/1991 | Zama et al. | 360/126 |
| 5,132,861 | 7/1992 | Behr et al. | 360/121 |
| 5,157,569 | 10/1992 | Kumasaka et al. | 360/126 |
| 5,173,825 | 12/1992 | Suzuki et al. | 360/126 |

FOREIGN PATENT DOCUMENTS

| 0 262 028 | 3/1988 | European Pat. Off. . |
| 2039124 | 7/1980 | United Kingdom . |

OTHER PUBLICATIONS

*Database WPI,* Section EI, Week 8637, Derwent Publications Ltd., London, GB; 4 Sep. 1986.
*Patent Abstracts of Japan,* vol. 13, No. 35, "Magnetic Head", by Otomo Moichi, 26 Jan. 1989.
*Patent Abstracts of Japan,* vol. 10, No. 389, "Thin Film Magnetic Head", by Sato Kazuhiro, 26 Dec. 1986.
*Patent Abstracts of Japan,* vol. 11, No. 285, "Thin Film Magnetic Head", by Noboru Wakabayashi, 16 Sep. 1987.
*Patent Abstracts of Japan,* vol. 13, No. 27, "Thin Film Magnetic Head", by Kobayashi Tomio, 20 Jan. 1989.
*Patent Abstracts of Japan,* vol. 12, No. 147, "Magnetic Head", by Konuki Akio, 7 May 1988.

*Primary Examiner*—Robert S. Tupper
*Attorney, Agent, or Firm*—Hill, Steadman & Simpson

[57] ABSTRACT

A magnetic head is disclosed in which a pair of magnetic core halves, each having a magnetic metal film formed in the vicinity of at least a substrate surface facing a magnetic recording medium, are abutted to each other for defining a magnetic gap between the magnetic metal films, wherein a recess for forming a coil is formed in an abutting surface of at least one of the magnetic core halves and the coil formed by a thin film forming technique is arranged within the recess. A multi-channel magnetic head is also disclosed which includes a plurality of magnetic heads having different azimuth angles of the magnetic gaps, wherein each magnetic head is formed by abutting a pair of magnetic core halves to each other, each of the magnetic core halves having a magnetic metal film formed in the vicinity of at least a substrate surface facing a magnetic recording medium, for defining a magnetic gap between the magnetic metal films, and wherein a recess for forming a coil is formed in the abutting surface of at least one of the magnetic core halves, and the coil is formed in the recess by thin film forming technique. The methods for producing the magnetic head and the multi-channel magnetic head are also disclosed.

19 Claims, 33 Drawing Sheets

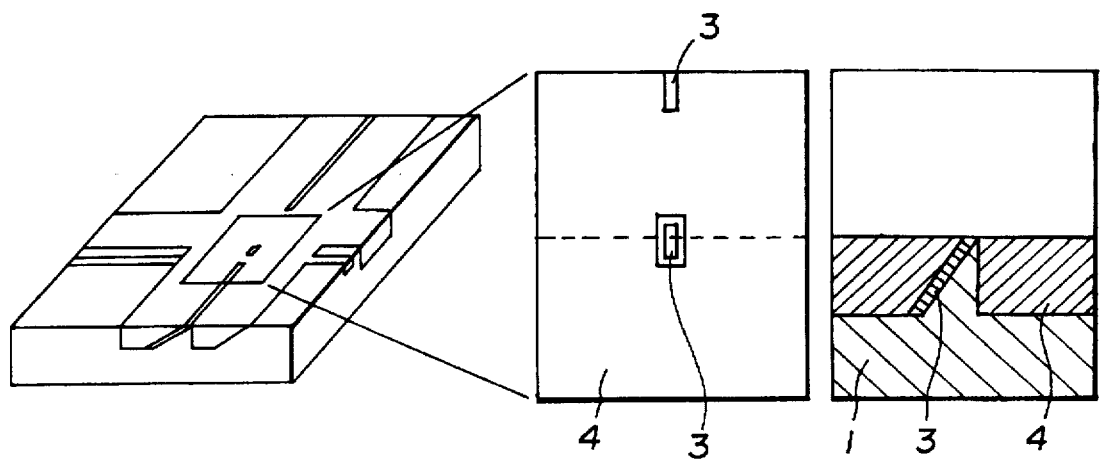
FIG.10A  FIG.10B
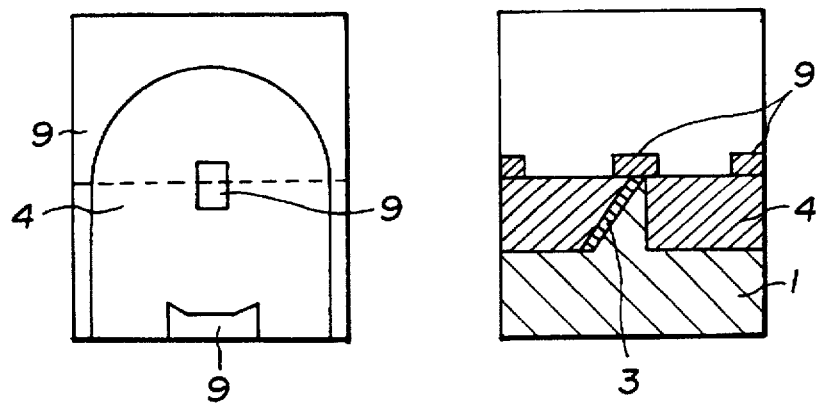
FIG.11A  FIG.11B

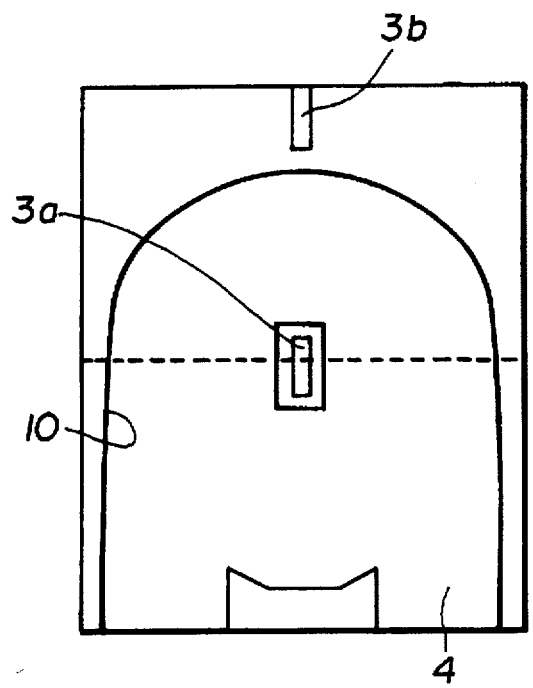 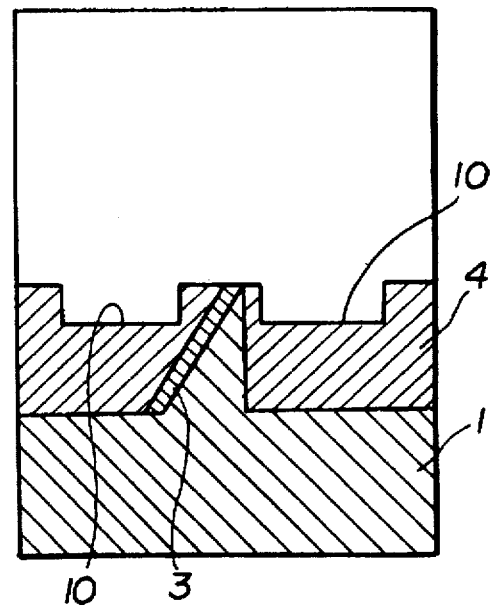
FIG.12A  FIG.12B
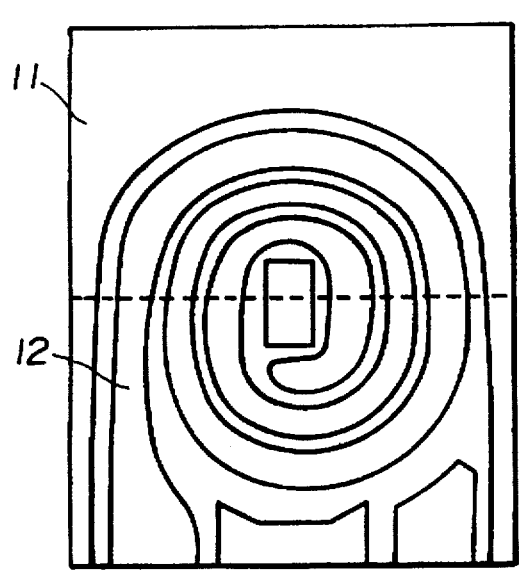 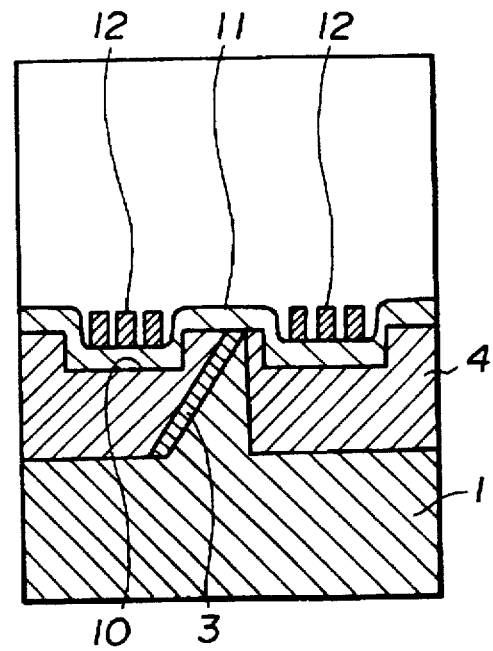
FIG.13A  FIG.13B

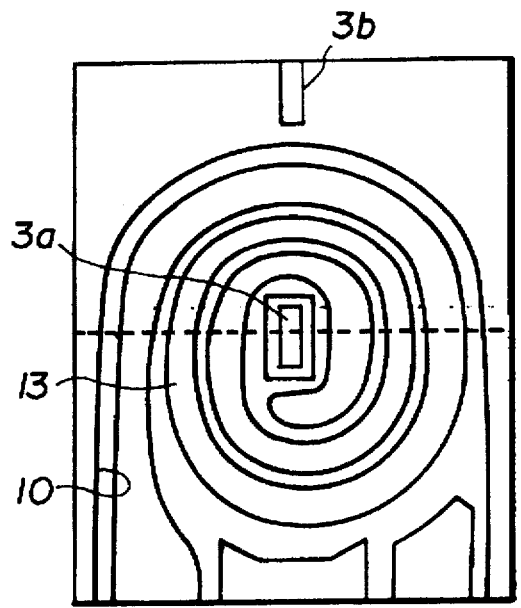 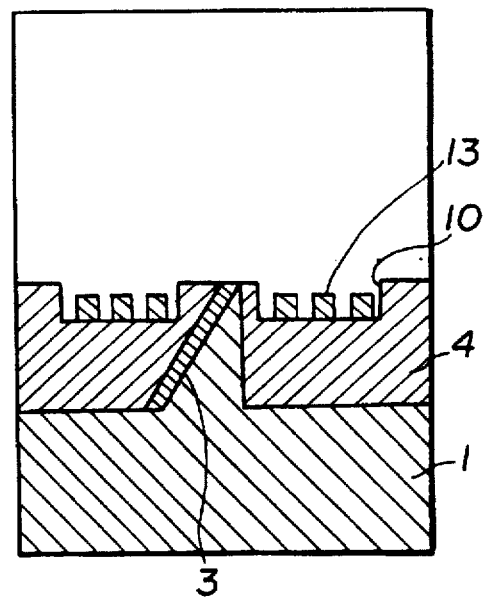
FIG.14A  FIG.14B
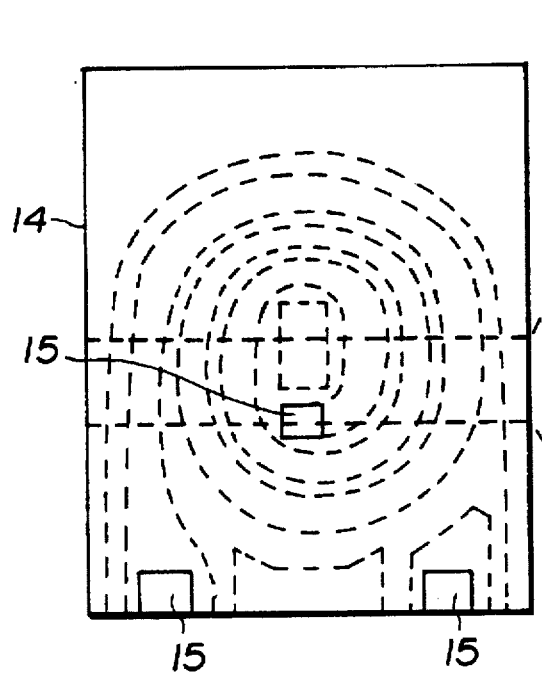 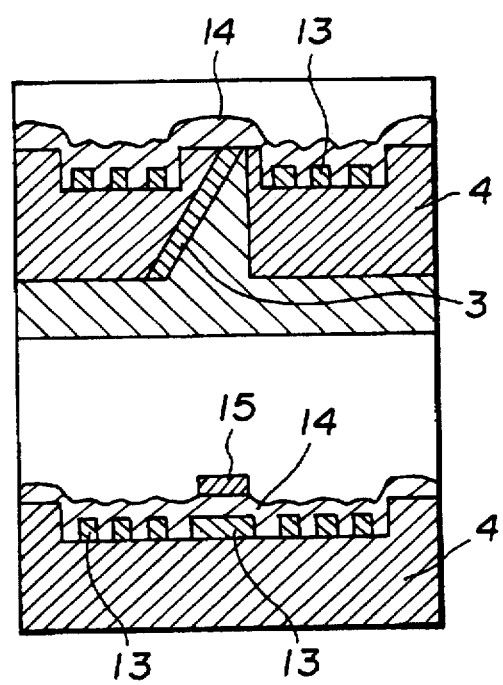
FIG.15A  FIG.15B

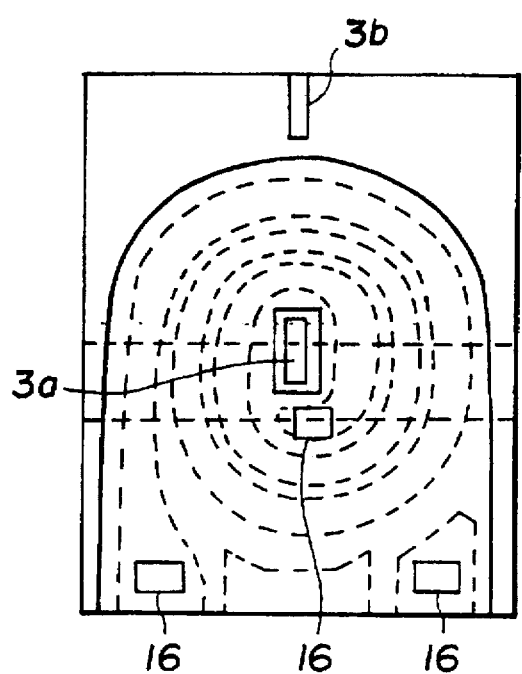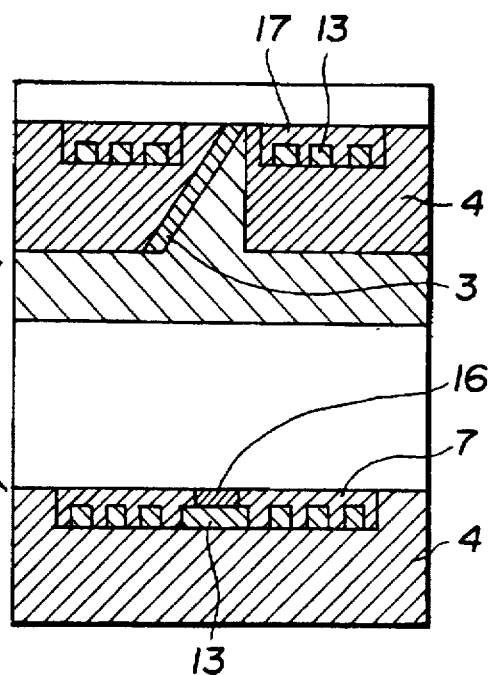
FIG.18A  FIG.18B
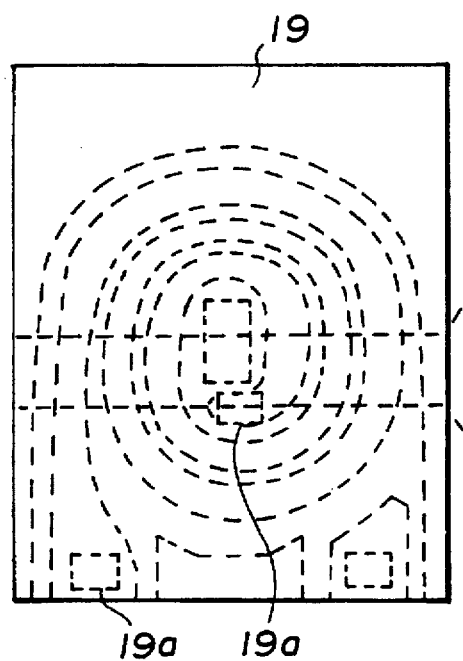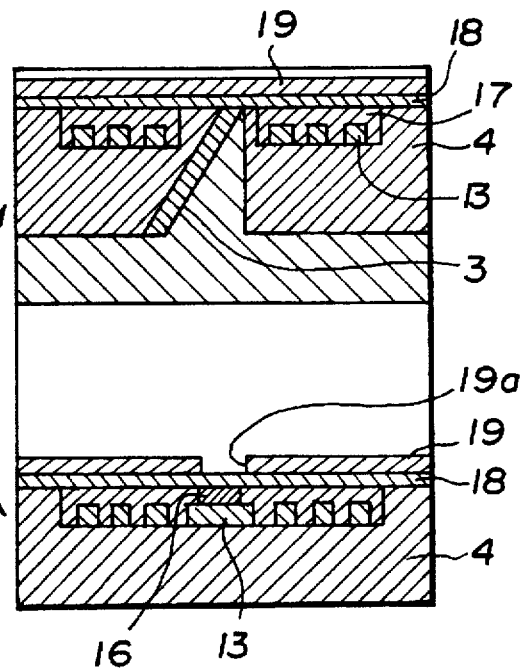
FIG.19A  FIG.19B

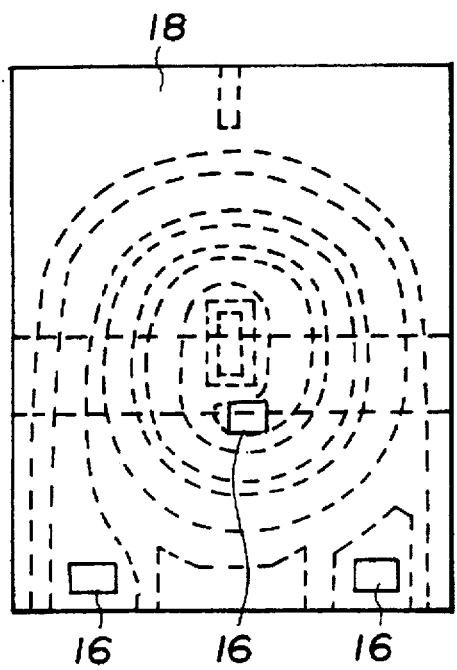 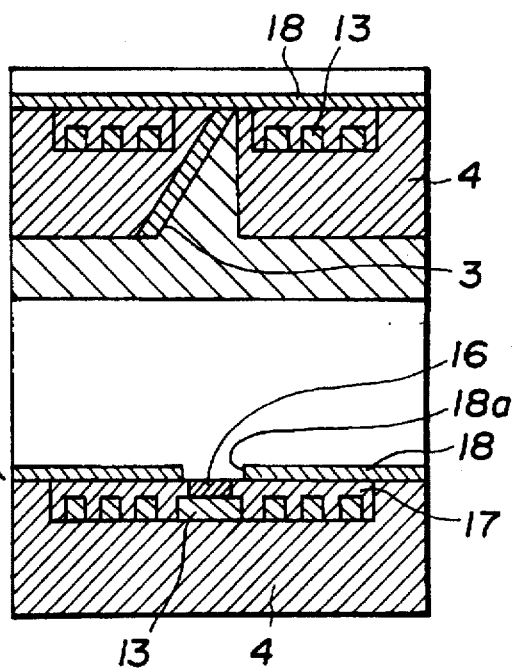
FIG.20A  FIG.20B
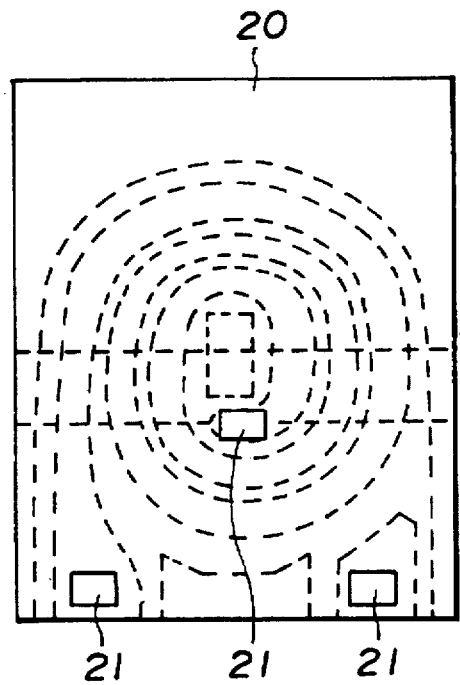 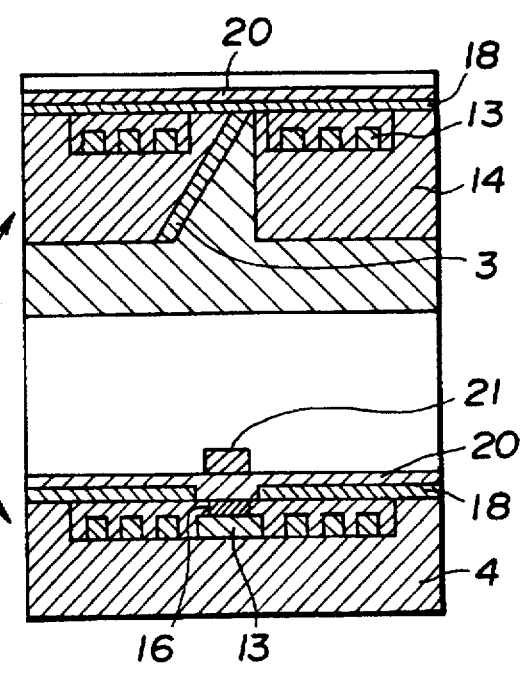
FIG.21A  FIG.21B

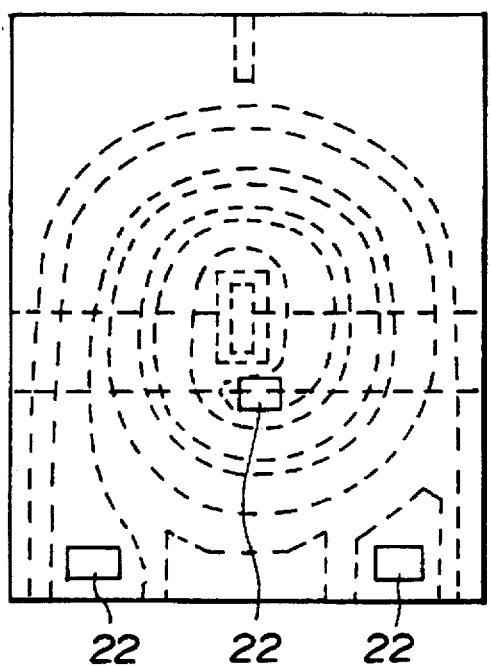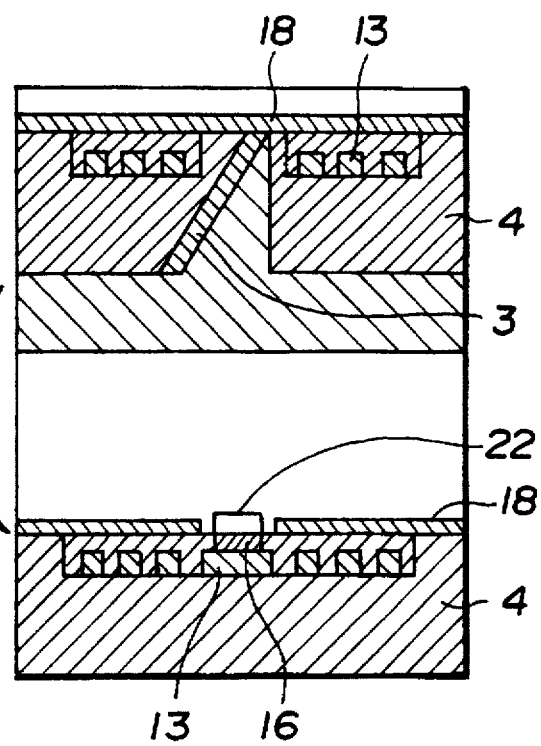
FIG.22A FIG.22B

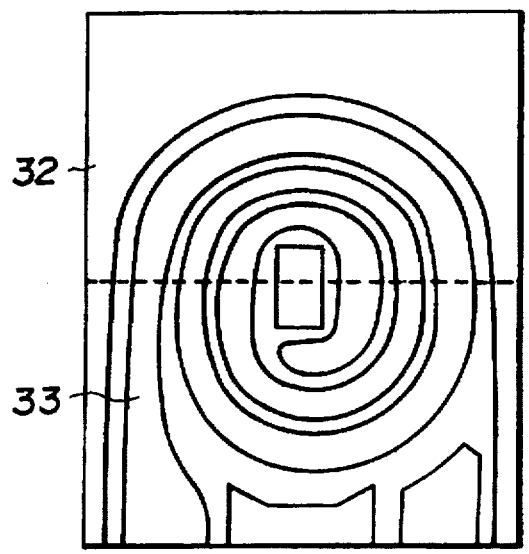 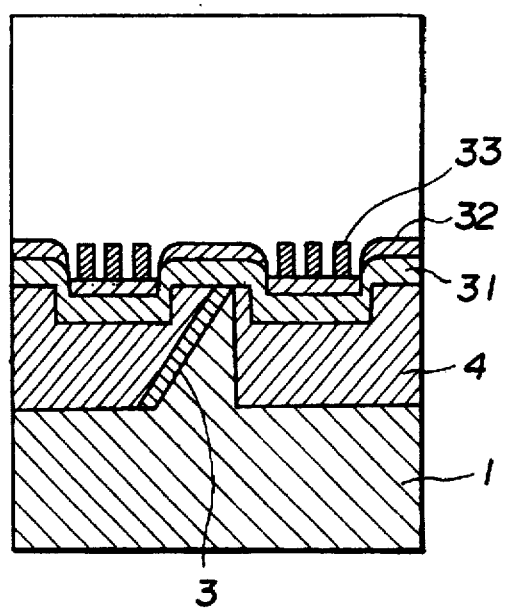
FIG.27A  FIG.27B
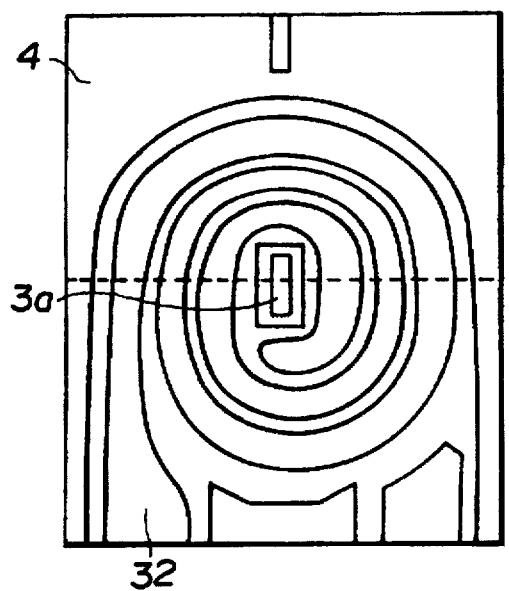 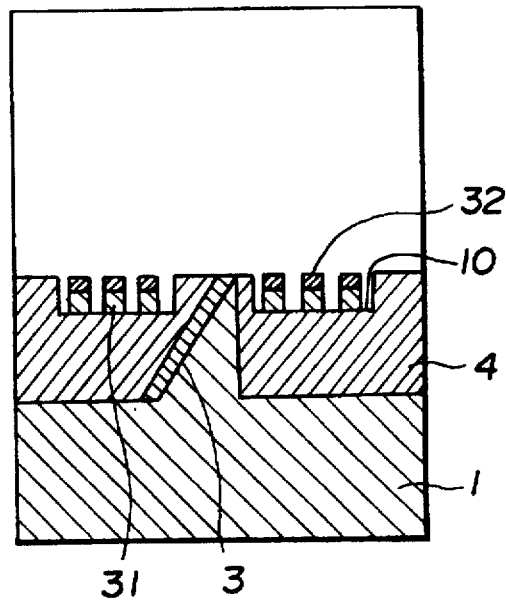
FIG.28A  FIG.28B

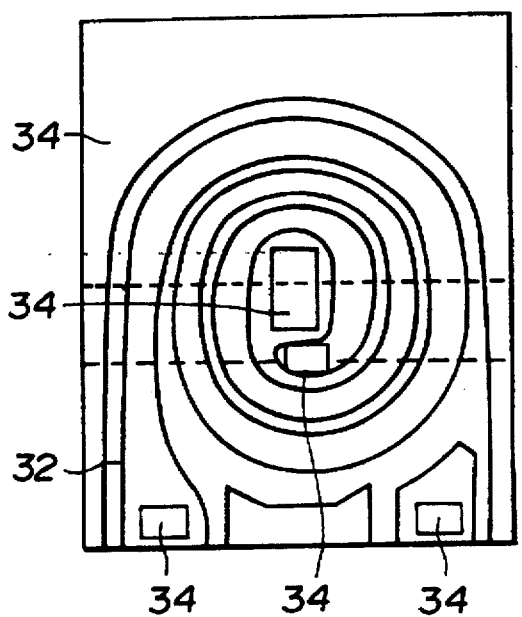
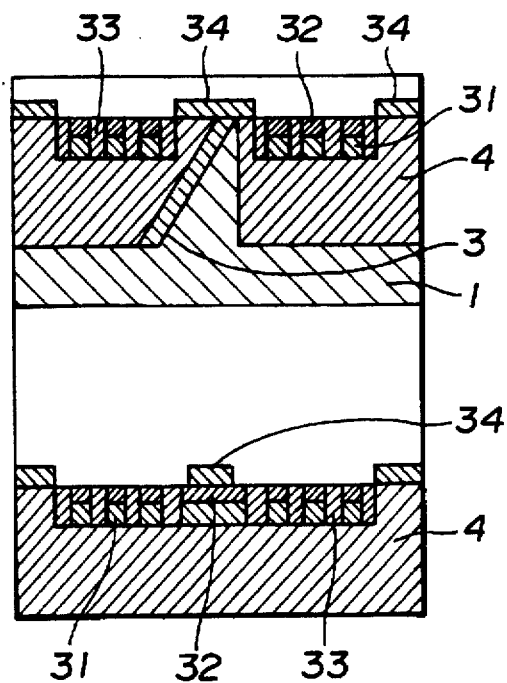
FIG.31A FIG.31B
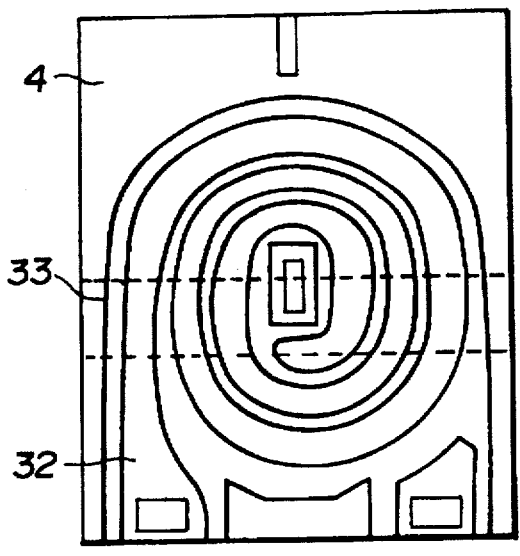
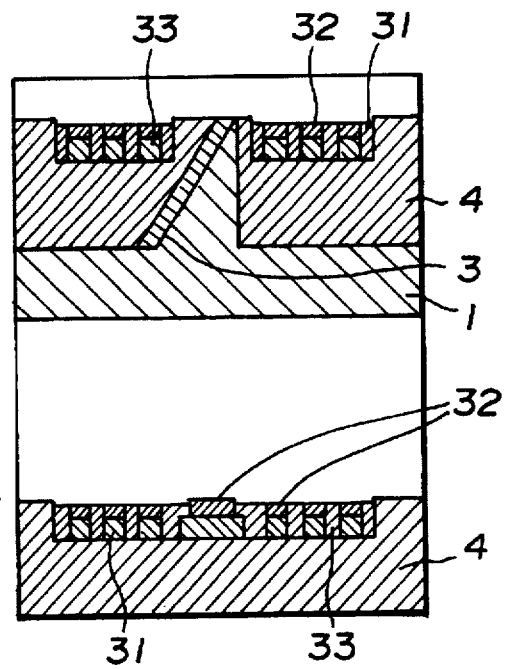
FIG.32A FIG.32B

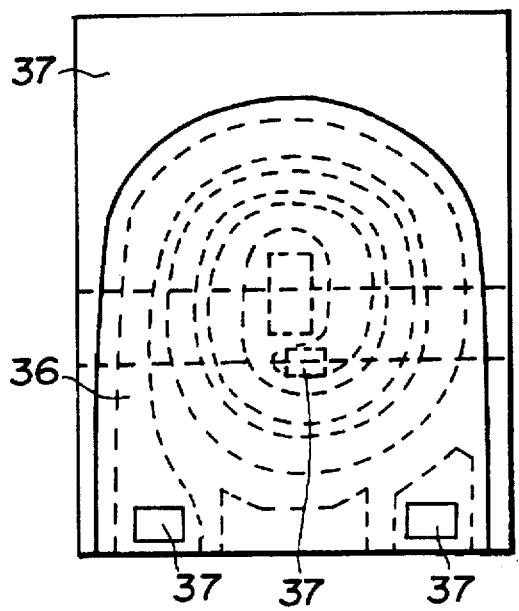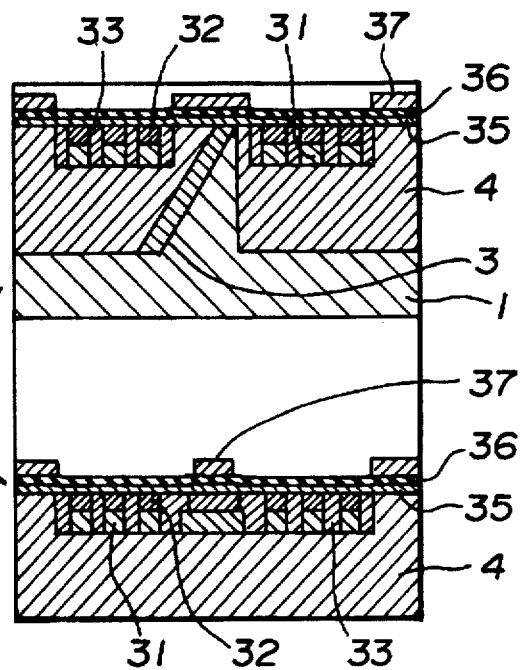
FIG.33A  FIG.33B
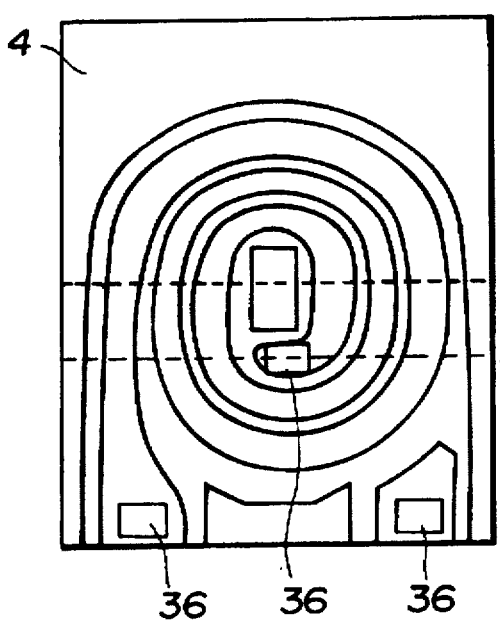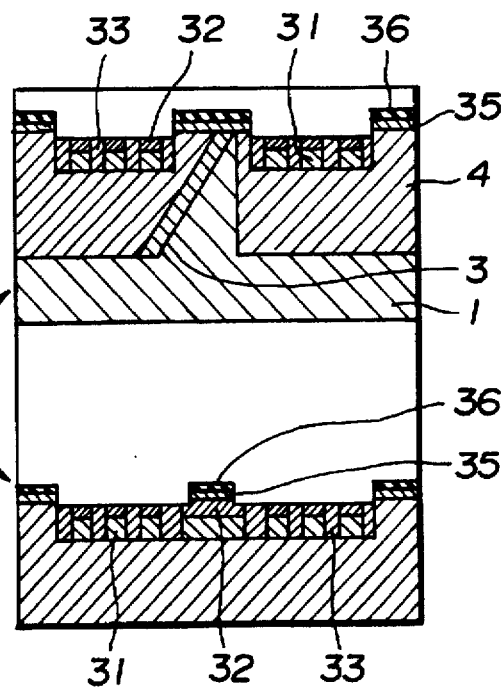
FIG.34A  FIG.34B

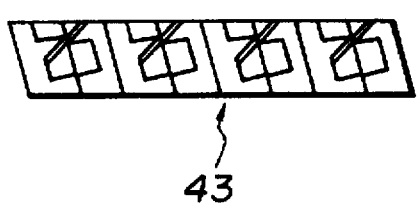
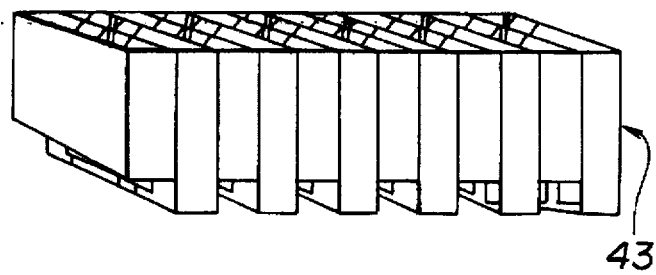
FIG.40A    FIG.40B
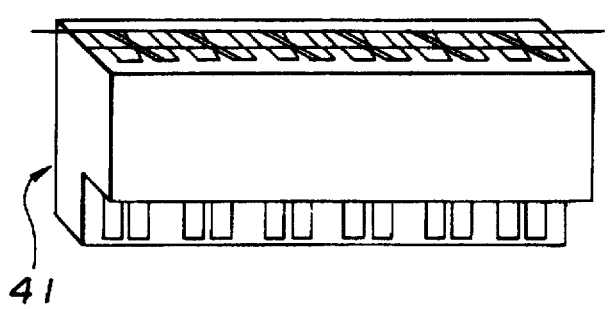
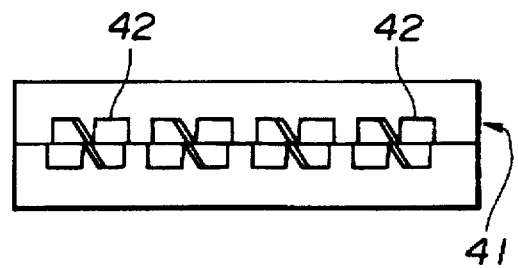
FIG.41A    FIG.41B

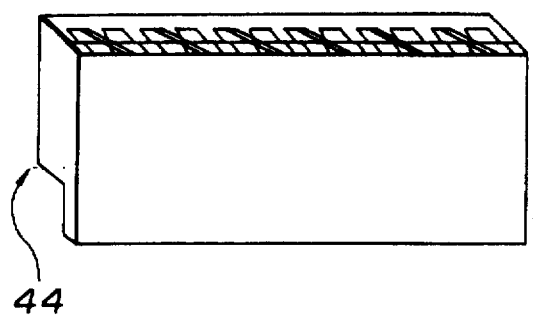
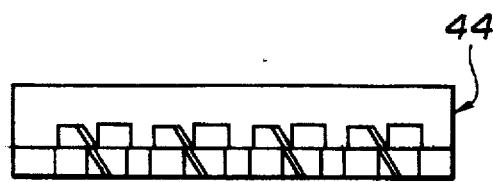
FIG.42A  FIG.42B
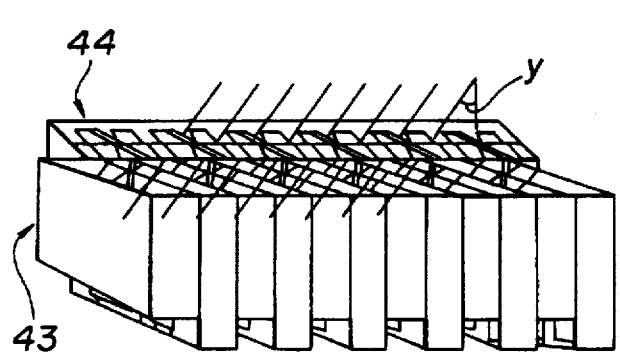
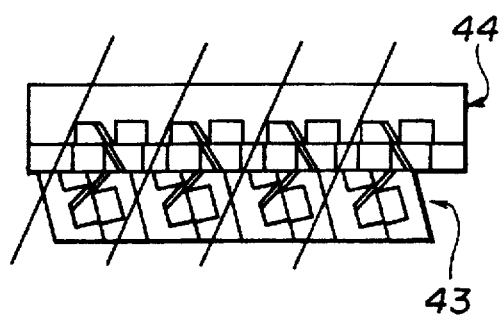
FIG.43A  FIG.43B

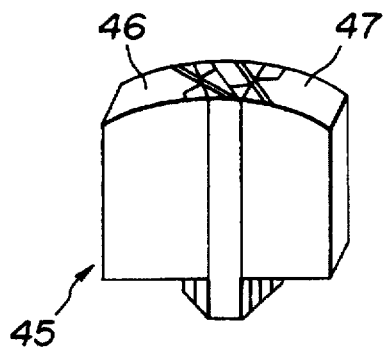 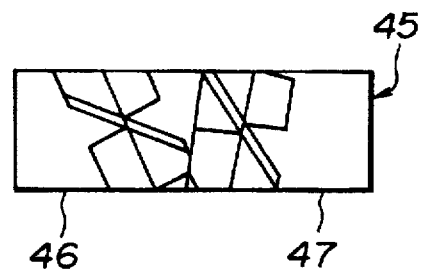
FIG.44A  FIG.44B
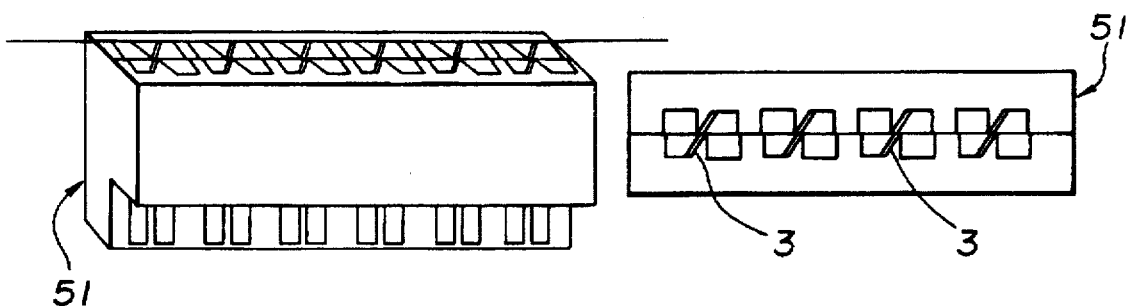 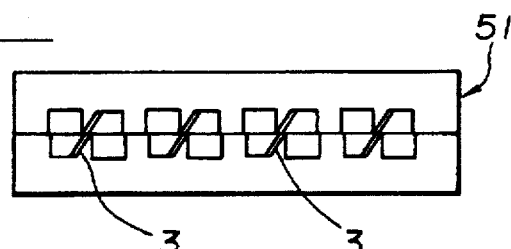
FIG.45A  FIG.45B

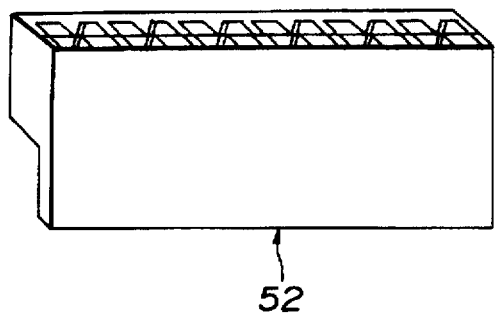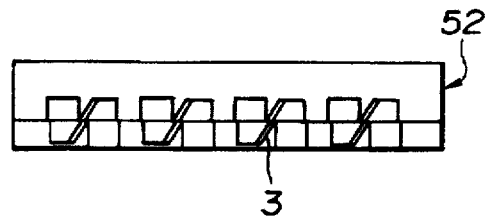
FIG.46A  FIG.46B
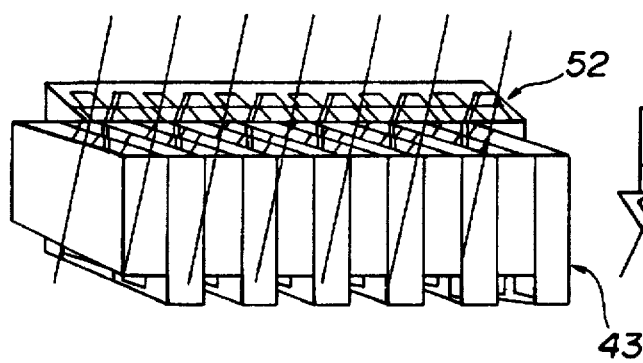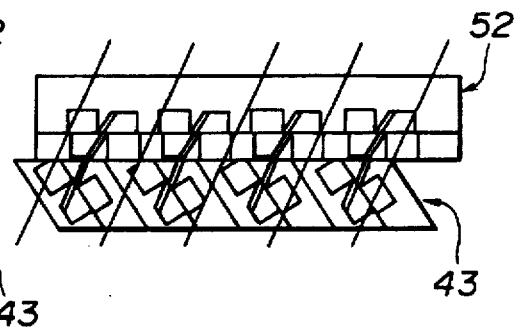
FIG.47A  FIG.47B

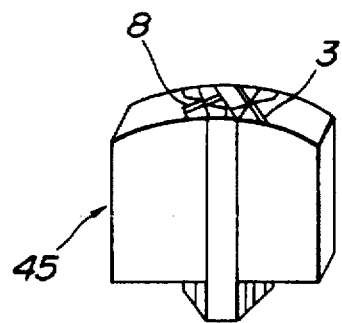
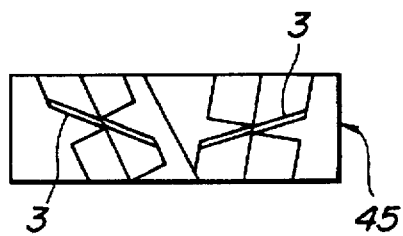
FIG.48A  FIG.48B
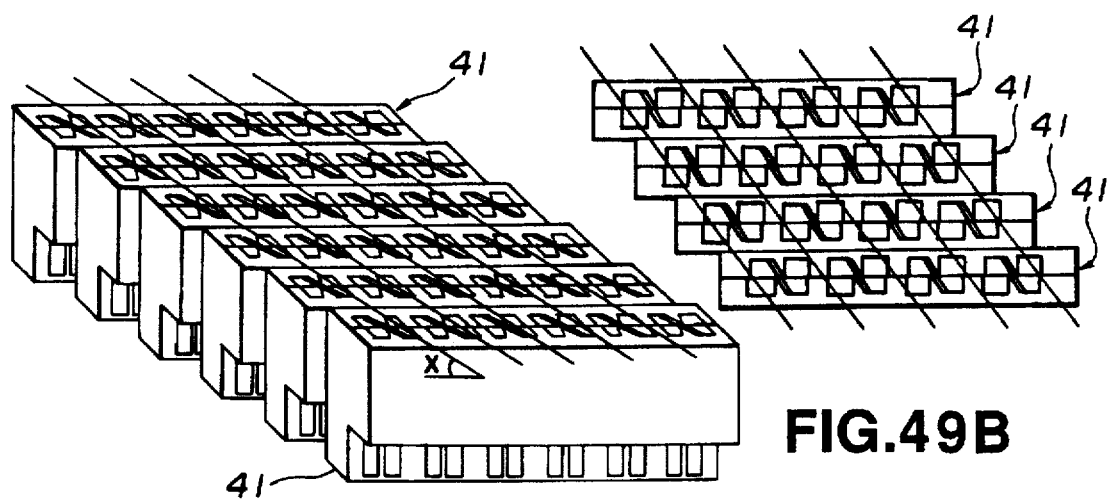
FIG.49A  FIG.49B

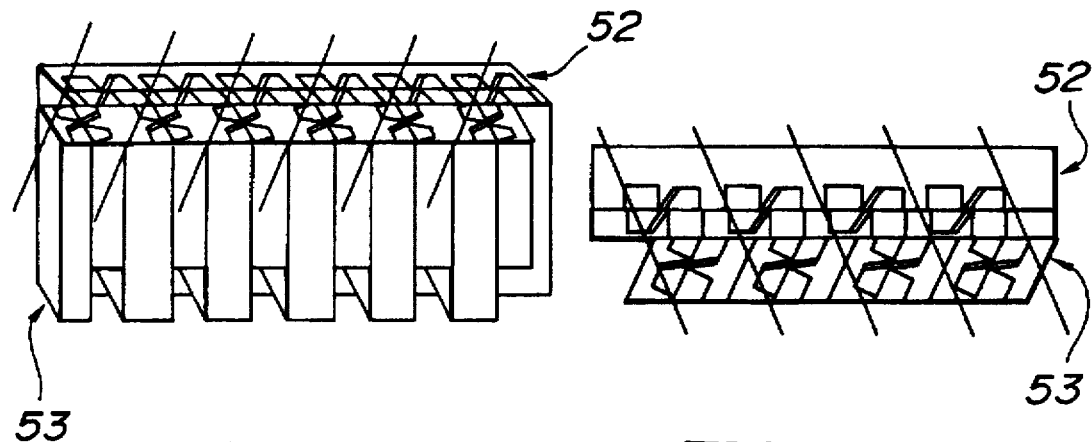
FIG.50A    FIG.50B
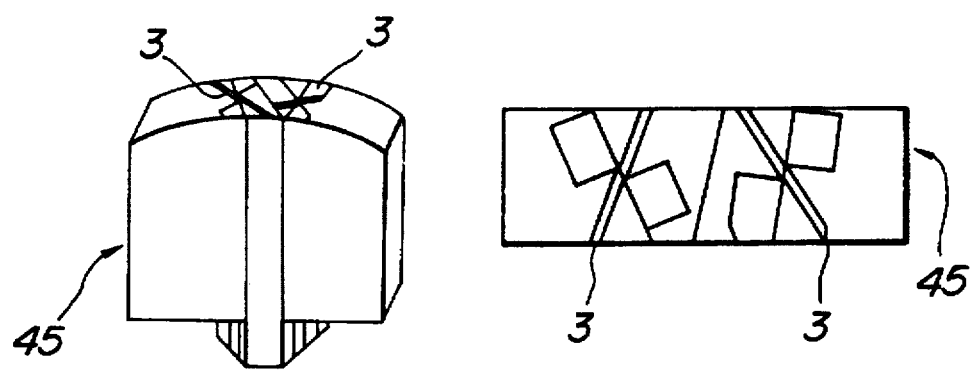
FIG.51A    FIG.51B

MAGNETIC HEAD AND METHOD FOR MANUFACTURE THEREOF

This is a continuation of application Ser. No. 08/202,151 filed Feb. 25, 1994 now abandoned.

BACKGROUND OF THE INVENTION

This invention relates to a magnetic head having its magnetic path constituted by a magnetic metal film, and a method for manufacture thereof. More particularly, it relates to a magnetic head having its coil formed by a thin film process, and a method for manufacture thereof.

As magnetic heads for VTRs, a so-called metal-in-gap type magnetic head, in which a magnetic metal film is formed on the magnetic gap forming surface of the ferrite magnetic core, or a laminated magnetic head having a magnetic metal film sandwiched between non-magnetic ceramic layers, is currently employed. For coping with the future tendency towards higher picture quality and digitalization, higher electro-magnetic conversion characteristics need to be achieved for higher frequencies. Besides, plural magnetic heads need to be loaded on a small-sized drum.

However, the above-mentioned metal-in-gap magnetic head has a larger impedance and is not suited to application in a higher frequency range. On the other hand, it is necessary with the laminated magnetic head to decrease the thickness of the magnetic metal film of the magnetic path in conjunction with decrease in the track width brought about by the recording with an increasingly high recording density. The result is the lowering of the playback efficiency and certain limitations placed on the increase in the number of magnetic heads.

There has hitherto been proposed a magnetic head in which, for successfully coping with signals in the high frequency range, the magnetic path constituted by the magnetic metal film is reduced in area as compared to that with the conventional VTR head, and in which a thin film coil is formed on the magnetic gap forming surface using the thin film forming technique, as disclosed for example in JP Patent Kokai Publication No. 63-231713 (1988).

However, it becomes necessary with such construction of the magnetic head to provide a space for accommodating the thin film coil in the counterpart magnetic core provided facing the magnetic core having the thin film coil formed thereon.

If the space is formed by a machining operation, an opening which needs to be plugged with glass or the like is necessarily formed on the surface of the magnetic head on which the magnetic recording medium is slid.

During the glass plugging process, which is an indispensable process, molten glass flows on the thin film coil portion, thus raising the problems such as line breakage or shorting.

Besides, since there is a risk of damages done or the stress applied to the magnetic gap forming surface of the substrate during fabrication of the thin film coil, there is raised a problem in connection with difficulties in maintaining gap accuracy. Thus it is difficult to apply the prior-art technique to a multi-channel magnetic head for which strict gap accuracy is a requirement.

OBJECTS AND SUMMARY OF THE INVENTION

It is therefore an object of the present invention to obviate the problems of the above-described magnetic heads and to provide a highly reliable magnetic head in which it is unnecessary to cast glass into the space and there is no risk of line breakage or shorting of the thin film coil, and the method for manufacture thereof.

It is another object of the present invention to provide a magnetic head in which there is no risk of damages done or the stress applied to the magnetic gap forming surface and in which it is possible to maintain sufficient gap accuracy.

For accomplishing the above objects, the present invention provides a magnetic head in which a pair of magnetic core halves, each having a magnetic metal film formed in the vicinity of at least a substrate surface facing a magnetic recording medium, are abutted to each other for defining a magnetic gap between the magnetic metal films, wherein a recess for forming a coil is formed in an abutting surface of at least one of the magnetic core halves, and the coil formed by a thin film forming technique is arranged within the recess.

The present invention also provides a method for producing a magnetic head comprising the steps of charging glass into abutting surfaces of a pair of substrates on which magnetic metal films are previously formed, planarizing the substrate surfaces, forming recesses by ion milling in coil-forming areas on the abutment surface of at least one of the substrates, forming a conductor film in the recess and patterning the conductor film by photolithographic technique for forming a coil, forming an insulating film for covering the coil and the recess, grinding the abutment surface to a planar abutting surface, and abutting the substrates to each other via a gap material in-between.

The present invention also provides a multi-channel magnetic head comprising a plurality of magnetic heads having different azimuth angles of the magnetic gaps, wherein each magnetic head is formed by abutting a pair of magnetic core halves to each other, each of the magnetic core halves having a magnetic metal film formed in the vicinity of at least a substrate surface facing a magnetic recording medium, for defining a magnetic gap between the magnetic metal films, and wherein a recess for forming a coil therein is formed in the abutting surface of at least one of the magnetic core halves, and the coil is formed in the recess by thin film forming technique.

The present invention also provides a method for producing a multi-channel magnetic head comprising the steps of charging glass into abutting surfaces of a pair of substrates on which magnetic metal films are previously formed, planarizing the substrate surfaces, forming recesses by ion milling in coil-forming areas on the abutment surface of at least one of the substrates, forming a conductor film in the recess and patterning the conductor film by photolithographic technique for forming a coil, forming an insulating film for covering the coil and the recess and grinding the abutment surface to a planar abutting surface, abutting the substrates to each other via a gap material in-between to form a unit magnetic head block, stacking a plurality of the unit magnetic head blocks, slicing the stacked unit magnetic head blocks at a pre-set angle to form an inclined magnetic head block a magnetic gap of which has a certain pre-set angle relative to the slicing surface, and integrally bonding a plurality of the inclined magnetic head blocks or the inclined magnetic head block and the unit magnetic head block so that the head blocks thus bonded to each other have different angles of the magnetic heads relative to the slicing surface.

According to the present invention, since the recess having a shape conforming to the coil shape is formed around the back gap, and the coil is formed within the recess, there is no risk of a wasteful opening or hole being formed on the sliding surface for the magnetic recording medium, so that there is no necessity of plugging the opening with glass and hence the thin film coil may be prevented from being broken or shorted due to glass plugging.

Besides, according to the present invention, since the coil is formed in the recess defined by ion milling and the abutting surface, that is the magnetic gap forming surface, is planarized, sufficient accuracy in the magnetic gap may be assured.

Since it is unnecessary to cast glass, a magnetic head and a multi-channel magnetic head may be provided in which there is no risk of breakage or shorting of the thin film coil.

Likewise, according to the present invention, since the magnetic gap forming surface is planarized after forming the coil, there is no risk of damages done or the stress applied to the magnetic gap forming surface, so that sufficient accuracy in the magnetic gap may be assured.

BRIEF DESCRIPTION OF THE DRAWINGS

FIGS. 1 to 26 illustrate the process for producing each magnetic head block, step by step, wherein FIG. 1 is a schematic perspective view showing a substrate.

FIG. 2 is a schematic perspective view showing a first trough-forming step.

FIG. 3 is a schematic perspective view showing a magnetic metal film forming step.

FIG. 4 is a schematic perspective view showing a glass casting step.

FIG. 5 is a schematic perspective view showing second and third trough-forming steps.

FIG. 6 is a schematic perspective view showing a further glass casting step.

FIG. 7 is a schematic perspective view showing fourth and fifth trough-forming steps.

FIG. 8 is a schematic perspective view showing glass casting and planarizing step.

FIG. 9 is an enlarged perspective view showing essential parts of a block produced by the step shown in FIG. 8.

FIGS. 10A and 10B show the vicinity of a back gap in a perspective, plan and cross-sectional views.

FIGS. 11A and 11B showing a photoresist layer forming step in plan and cross-sectional views, respectively.

FIGS. 12A and 12B show a trough-forming step in plan and cross-sectional views, respectively.

FIGS. 13A and 13B show a step of forming a good conductive layer and a photoresist layer in plan and cross-sectional views, respectively.

FIGS. 14A and 14B show a coil-forming step in plan and cross-sectional views, respectively.

FIGS. 15A and 15B show a step of forming a metal film for a contact electrode in plan and cross-sectional views, respectively.

FIGS. 18A and 18B show a planarizing step in plan and cross-sectional views, respectively.

FIGS. 19A and 19B show a non-magnetic film forming step in plan and cross-sectional views, respectively.

FIGS. 20A and 20B show a non-magnetic film etching step in plan and cross-sectional views, respectively.

FIGS. 21A and 21B show an Au thin film forming step in plan and cross-sectional views, respectively.

FIGS. 22A and 22B show an Au electrode forming step in plan and cross-sectional views, respectively.

FIGS. 23 is a schematic perspective view showing a step of abutting magnetic core blocks.

FIGS. 24 is a schematic perspective view showing the state of junction of the magnetic core blocks.

FIGS. 25 is an enlarged schematic cross-sectional view taken along line x—x in FIG. 24.

FIG. 26 is a schematic perspective view showing a produced magnetic head.

FIGS. 27 to 37 illustrate another embodiment of the process for producing each magnetic head block, in which FIGS. 27A and 27B show a step of forming a good conductive metal film, a metal film for a contact electrode and a photoresist layer in plan and cross-sectional views, respectively.

FIGS. 28A and 28B show a coil-forming step in plan and cross-sectional views, respectively.

FIGS. 31A and 31B show a photoresist film forming step in plan and cross-sectional views, respectively.

FIGS. 32A and 32B show the ion-milled state of the metal film for the contact electrode and the glass in plan and cross-sectional views, respectively.

FIGS. 33A and 33B show a step of forming a non-magnetic metal film, an Au thin film and a photoresist layer in plan and cross-sectional views, respectively.

FIGS. 34A and 34B show a step of etching the non-magnetic metal film and the Au thin film in plan and cross-sectional views, respectively.

FIG. 35 is a perspective view showing a magnetic core block abutting step.

FIG. 36 is a perspective view showing a magnetic core block pressing and bonding step.

FIG. 37 is a cross-sectional view showing the state in which a contact part of the metal film for the contact electrode is electrically connected to a non-magnetic metal film and an Au film.

FIGS. 38 to 44 illustrate the method for producing a 2-channel head using a sole magnetic head block, in which

FIGS. 40A and 40B show a severed first multi-head block in schematic perspective and schematic plan views, respectively.

FIGS. 41A and 41B show a grinding step for the other magnetic head block in schematic perspective and schematic plan views, respectively.

FIGS. 42A and 42B show an as-ground second multi-head block in schematic perspective and schematic plan views, respectively.

FIGS. 43A and 43B show a bonding and slicing step for the first and second multi-head block in schematic perspective and schematic plan views, respectively.

FIGS. 44A and 44B show a produced 2-channel head in schematic perspective and schematic plan views, respectively.

FIGS. 45 to 48 show the method for producing a 2-channel head using a sole magnetic head block, in which FIGS. 45A and 45B show a magnetic head block having magnetic metal films inclined in different directions of inclination in schematic perspective and schematic plan views, respectively.

FIGS. 46A and 46B show an as-ground second multi-head block in schematic perspective and schematic plan views, respectively.

FIGS. 47A and 47B show a bonding and slicing step for the first and second multi-head block in schematic perspective and schematic plan views, respectively.

FIGS. 48A and 48B show a produced 2-channel head in schematic perspective and schematic plan views, respectively.

FIGS. 49 to 51 illustrate the method for producing a 2-channel head using a sole magnetic head block, in which FIGS. 49A and 49B show a magnetic head block bonding step and a magnetic head block severing step in schematic perspective and schematic plan views, respectively.

FIGS. 50A and 50B show a bonding and slicing step for the first and second multi-head block in schematic perspective and schematic plan views, respectively.

FIGS. 51A and 51B show a produced 2-channel head in schematic perspective and schematic plan views, respectively.

FIGS. 52 to 57 shows the method for producing a 4-channel head, step by step, in which FIG. 52 is a schematic perspective view showing a first multi-head block.

FIG. 53 is a schematic perspective view showing a second multi-head block.

FIG. 54 is a schematic perspective view showing a third multi-head block.

FIG. 55 is a schematic perspective view showing a fourth multi-head block.

FIG. 56 show a bonding and slicing step for the first to fourth multi-head blocks in schematic perspective.

DETAILED DESCRIPTION OF THE PREFERRED EMBODIMENTS

Figure 1:
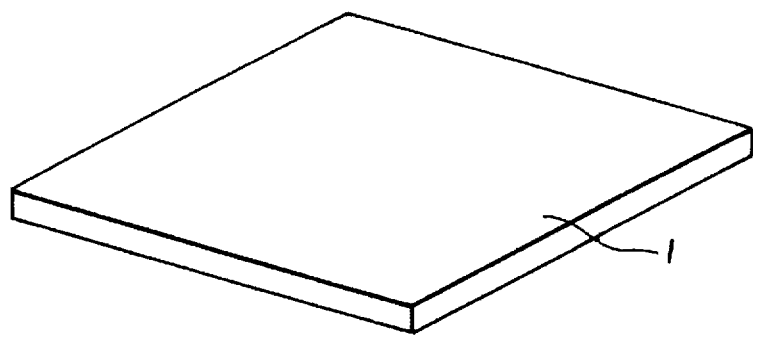
Figure 2:
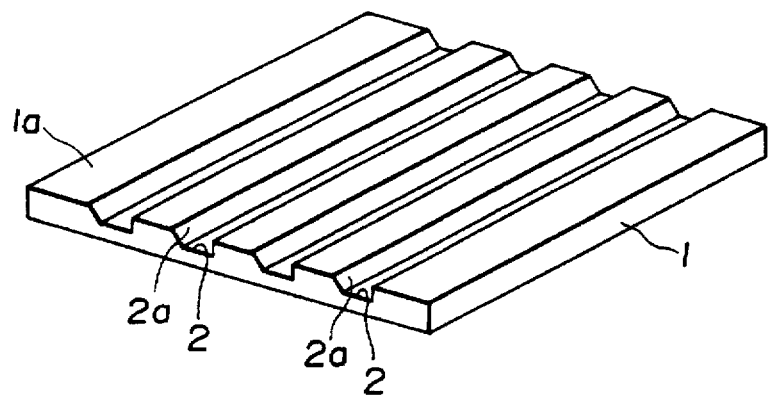

Referring to the drawings, illustrative embodiments of the present invention will be explained in detail.

With the magnetic head of the present invention, magnetic metal films are formed obliquely relative to the magnetic gap forming surface of each magnetic core and are aligned with the magnetic gap in-between.

The magnetic gap forming surface of the magnetic core constituting the magnetic head is recessed for accommodating a thin-film coil therein. The method for producing the magnetic head is first explained for clarifying the structure.

For producing a magnetic head, a substrate 1 in the form of a flat plate is prepared, as shown in FIG. 1.

The substrate 1 may be formed of a magnetic material, such as ferrite. However, it may also be formed of a non-magnetic material, such as potassium titanate, in view of preventing cross-talks in case of the magnetic head being designed as a multi-channel head, or lowering the impedance of the magnetic head.

Besides potassium titanate, a variety of non-magnetic materials may naturally employed. These non-magnetic materials include calcium titanate, barium titanate, zirconium titanate (zirconia), alumina, alumina titanium carbide, $SiO_2$, a MnO—NiO mixed sintered material, Zn ferrite, crystallized glass and high-hardness glass.

Then, trenching is carried out on a major surface 1a of the substrate 1. The trenching step is performed so that a magnetic metal film to be formed by the subsequent step will be formed obliquely relative to the major surface 1a of the substrate 1 which represents the magnetic gap forming surface. Thus, each trench 2 is formed parallel to a depth direction with a pre-set inclined surface 2a.

Figure 3:
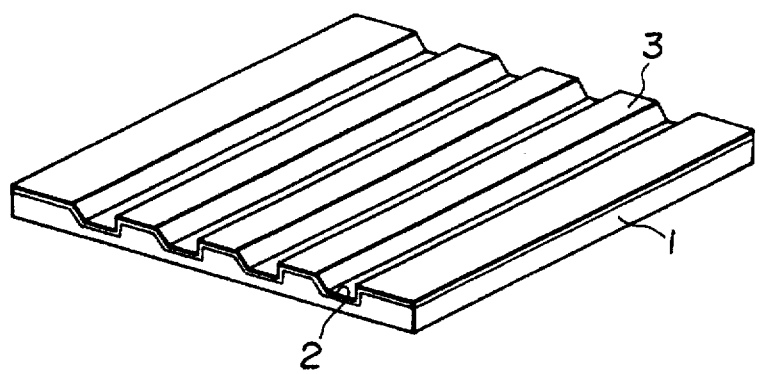

After the trenching step is completed, a magnetic metal film 3 is formed on the major surface 1a of the substrate 1 inclusive of the inside surfaces, above all, the inclined surfaces 1a, as shown in FIG. 3.

The magnetic metal film 3 may be formed by any of a variety of thin film forming processes, such as vacuum deposition or sputtering.

Any of the materials may be employed for the magnetic metal film 3, if it exhibits good soft magnetic properties. These materials include crystalline alloys such as, for example, Fe—Al—Si based alloys, Fe—Al based alloys, Fe—Si—Co based alloys, Fe—Ga—Si based alloys, Fe—Ga—Si—Ru based alloys, Fe—Al—Ge based alloys, Fe—Ga—Ge based alloys, Fe—Si —Ge based alloys, Fe—Co—Si —Al based alloys and Fe—Ni based alloys.

Alternatively, amorphous alloys, as typified by metal-metalloid based amorphous alloys, such as an alloy comprising one or more of elements Fe, Co and Ni and one or more of elements P, C, B and Si, or an alloy mainly comprising the firstly stated alloy and containing Al, Ge, Be, Sn, In, Mo, W, Ti, Mn, Cr, Zr, Hf or Nb, or metal- metal based amorphous alloys mainly comprising transition metals, such as Co, Hf or Zr and rare earth elements, may also be employed.

Figure 4:
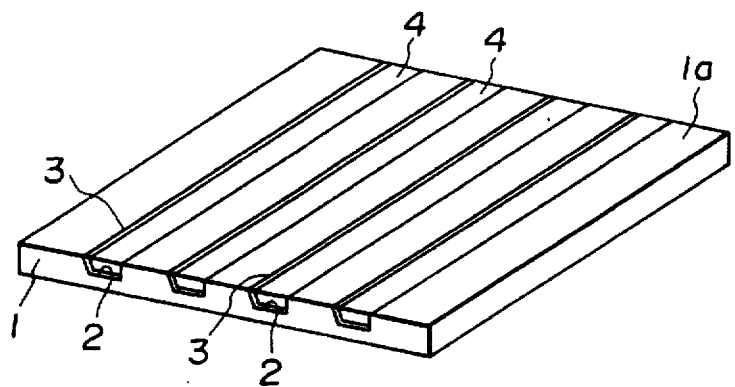
Figure 5:
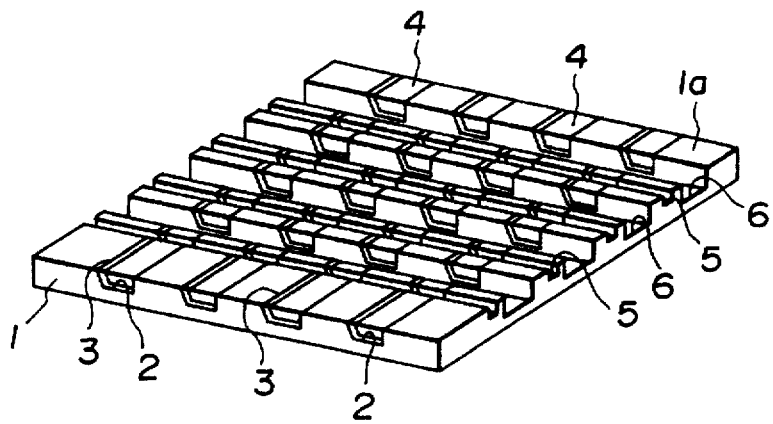

Then, glass 4 is charged into the troughs 2 formed on the substrate 1, as shown in FIG. 4. After planarizing the substrate surface, second troughs 5 and third troughs 6 are formed for extending in a direction at right angles to the troughs 2, as shown in FIG. 5.

The second troughs 5 are equivalent to winding slots in the customary bulk type magnetic head and are formed for defining the front depth and the back depth of the previously formed magnetic metal film 3 and for completing a closed loop magnetic path by the magnetic metal film 3. On the other hand, the third troughs 6 are formed for removing the magnetic metal film 3 which becomes redundant on ultimate assemblage of the magnetic head.

Figure 6:
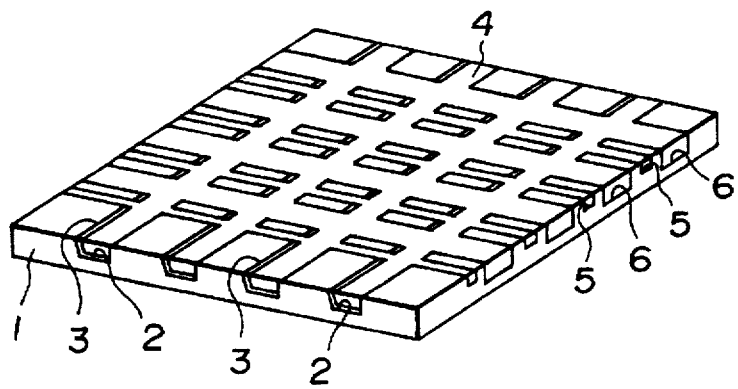

After machining the second troughs 5 and the third troughs 6, glass 4 is again charged, and the upper surface 1a is planarized, as shown in FIG. 6.

Figure 7:
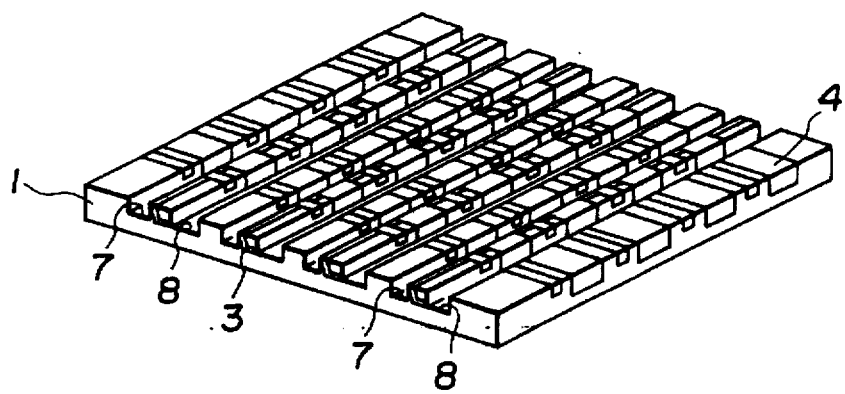

Then, fourth troughs 7 and fifth troughs 8 are machined for extending parallel to the previously formed troughs 2, as shown in FIG. 7. The fourth troughs 7 are formed so as to be in contact with upper edges of the magnetic metal films 3 formed on the inclined surfaces 2a, and define the abutting widths of the magnetic metal films 3, that is track widths. The fifth troughs 8 are provided for eliminating wasteful magnetic metal film portions present on the bottom surfaces of the troughs 2.

Figure 8:
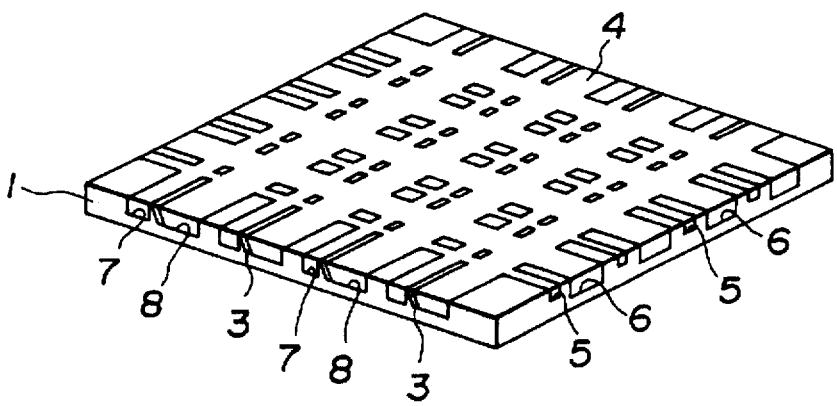

After the end of machining of the fourth and fifth troughs 7, 8, glass 4 is again charged into these troughs 7, 8, and the substrate surface is planarized, as shown in FIG. 8.

Figure 9:
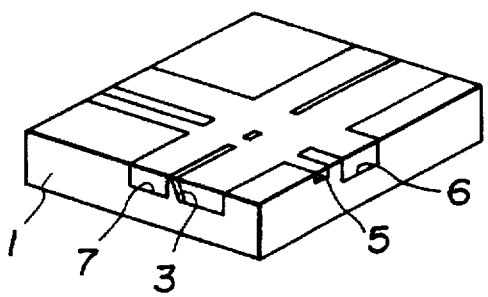

By the above process, the magnetic path by the magnetic metal films 3 is completed. FIG. 9 shows, to an enlarged scale, a portion of the substrate 1 corresponding to a sole magnetic head. The method of forming a coil in the region shown in FIG. 9 is hereinafter explained.

Similarly to FIG. 9, FIG. 10 shows the portion of the substrate 1 corresponding to a single magnetic head to an enlarged scale. The plan view of FIG. 10A shows a rectangular area in the substrate to an enlarged scale. The cross-sectional view of FIG. 10B is taken along a broken line in FIG. 10A. In the ensuing figures, the cross-sectional lines are taken in the similar manner.

The magnetic metal film 3, interrupted as shown in FIG. 10A, faces the magnetic gap forming surface. The magnetic metal film 3 comprises a centrally disposed back gap section 3a interrupted from a front gap section 3b by the trough 5. These sections 3a and 3b are formed obliquely relative to the substrate 1, as shown in FIG. 10B.

Around the back gap section 3a, the glass 4 charged into the troughs is exposed.

Then, a resist layer 9 is formed by a photolithographic technique substantially in register with the outer shape of the coil, as shown in FIG. 11.

Then, a recess 10 is formed in register with the outer shape of the coil by selective etching, such as by ion milling, as shown in FIG. 12.

Since it is the glass that is etched by ion milling, the recess 10 may be formed with high accuracy.

The depth of the recess 10 and the surface roughness of the bottom surface after two hours of milling are given as follows:

| substrate | TiO—CaO | single-crystal MnZn ferrite | SiO—PbO—BO glass |
|---|---|---|---|
| depth | 2.0 μm | 2.2 μm | 4.3 μm |
| roughness | 50 nm | 20 nm | 10 nm |

It may be seen that, by using the glass, the recess 10 of the coil portion may be formed with higher accuracy.

The recess 10 may be formed by techniques such as chemical etching, reactive ion etching or powder beam etching, in addition to the ion milling. Since these techniques peel atoms of the etched area physically and chemically and, if the etched area is polycrystalline, the peeling velocity differs with the difference in the crystal grains, it is difficult to form the planar recess 10. However, the planar recess 10 may be formed in the amorphous substance, such as glass. It is difficult with mechanical machining to form the space (recess) only in necessary areas.

After the formation of the recess 10 is completed, a film of a good electrically conductive metal 11 is formed on the entire surface inclusive of the recesses 10. A resist layer 12 is then formed in a patterned shape conforming to the coil shape.

The film of the good electrically conductive metal 11 may be formed by forming a film of Au, Ag, Cu or Al by sputtering, vacuum deposition or by plating.

The film of the good electrically conductive metal 11 is then etched by e.g. ion milling, using the resist layer 12 as a mask, as shown in FIG. 14, for forming a spiral-shaped coil 13.

At this time, the coil 13 is formed in the recess 10 formed in the glass 4, in a manner of surrounding the back gap section 3a. Although the coil 13 is of a single layer, it may also be formed in multiple layers.

A contact electrode is then formed at a pre-set position of the coil 13. The contact electrode is required for electrically connecting the coils 13 formed on both substrates 1 abutted together, and may be formed by a process similar to the process of forming the coil 13.

However, the contact electrode is ground during grinding of the magnetic gap forming surface, and has to be formed of a wear-and corrosion-resistant material, such as Cr, Ti, W, Mo, Ta or Nb.

Figure 16A:
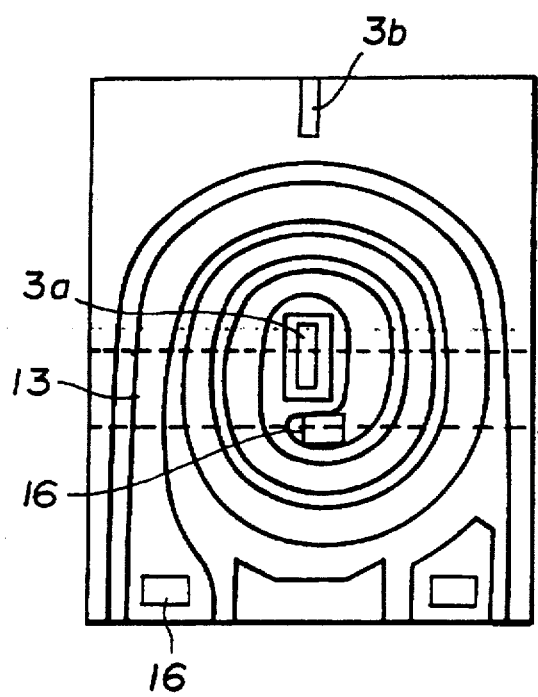
FIGS. 16A and 16B show an insulating film forming step in plan and cross-sectional views, respectively.
Figure 16B:
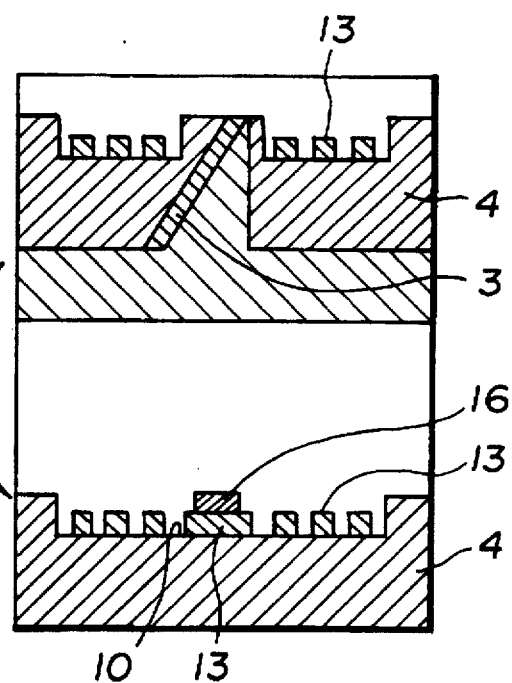

FIG. 15 shows the process of forming a metal film for a contact electrode. After the metal film for contact electrode 14 is formed on the entire substrate surface, a contact electrode 16 as shown in FIG. 16 is formed similarly to the coil 13 at a connecting portion only of the coil 13 by ion milling.

Figure 17A:
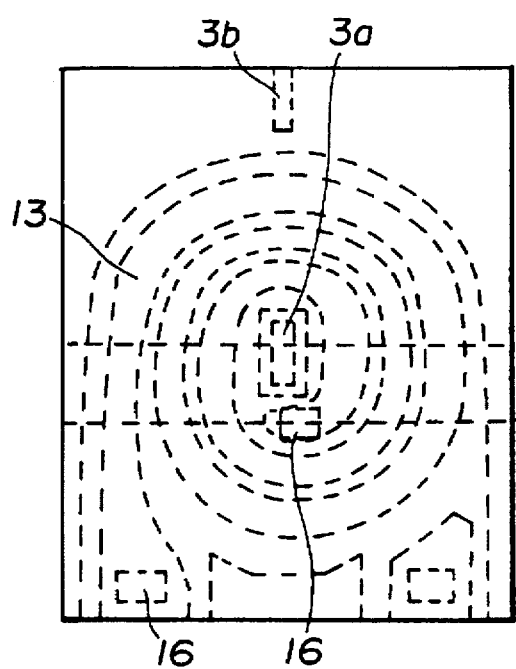
FIGS. 17A and 17B show an insulating film forming step in plan and cross-sectional views, respectively.
Figure 17B:
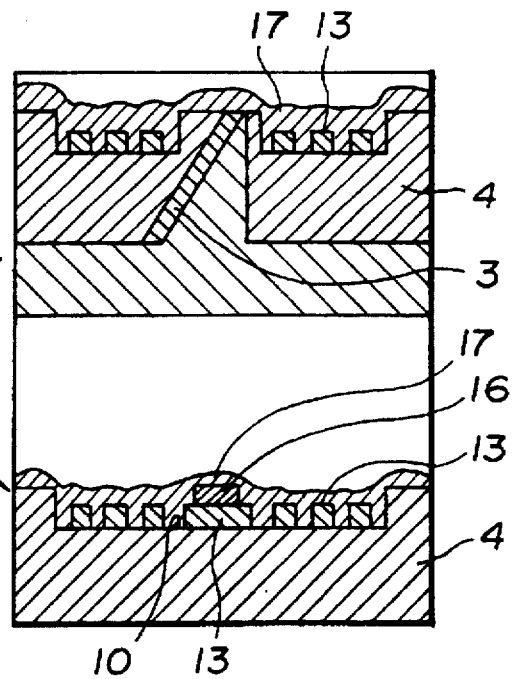

After the end of formation of the contact electrode 16, the inside of the recess 10 is filled with an insulating film 17, as a protective film for the coil 13, as shown in FIG. 17. The substrate surface is then planarized by grinding until the back gap section 3a, front gap section 3b and the contact electrode 16 are exposed, as shown in FIG. 18. The insulating film 17 may be formed of an insulating material, such as $SiO_2$ or $Al_2O_3$.

A non-magnetic film 18, comprised of a gap forming film and a glass film for gap bonding, is then formed, as shown in FIG. 19. A photoresist layer 19 is coated on the non-magnetic film 18.

The photoresist layer 19 is then processed with patterned exposure and development for partially removing the portion of the photoresist layer which is register with the contact electrode 16 for forming an opening 19a.

Then, the portion of the non-magnetic layer 18 facing the opening 19a formed in the photoresist layer 19 is etched off by ion milling or the like, for forming an opening 18a for exposing the contact electrode 16, as shown in FIG. 20.

Then, an Au thin film 20 is formed thereon, as shown in FIG. 21. A resist layer 21 is formed only at an area in register with the contact electrode 16. The Au thin film is then etched off by ion milling or the like, using the resist layer 21 as a mask. In this manner, an Au electrode 22 is formed on the contact electrode 16 to complete a magnetic head block 23, as shown in FIG. 22.

Figure 23:
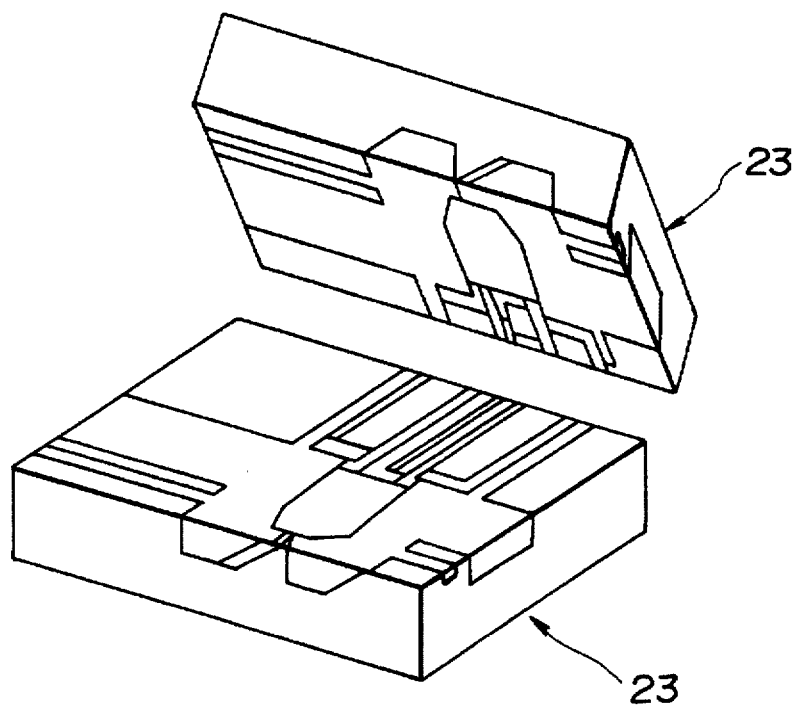
Figure 24:
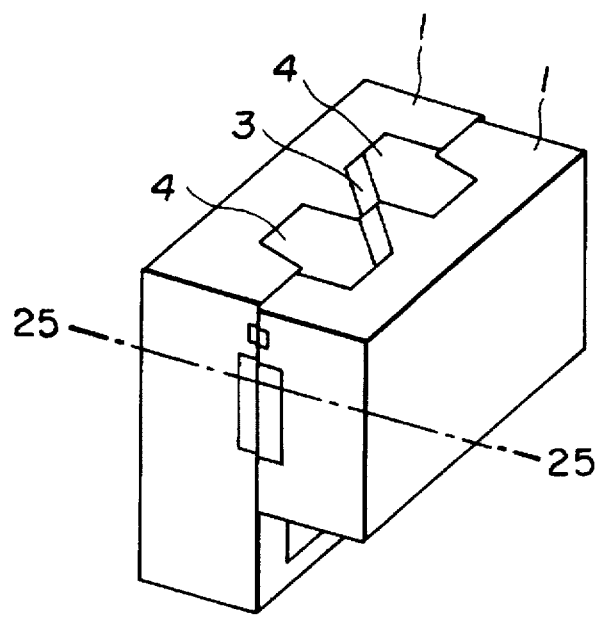

Two of the magnetic head blocks 23, 23 are abutted to each other, as shown in FIG. 23 and pressed and bonded to each other at elevated temperatures to form a combined block, as shown in FIG. 24. The inside of the recess 10 in which the coil 13 is formed is protected by the insulating film 17 and thereby the glass is prevented from flowing into the inside of the recess 10 to prevent inadvertent line breakage or shorting.

When abutting the magnetic head blocks 23, 23 to each other, the rear side of one of the magnetic head blocks 23 is cut short in order to permit a lead-out electrode of the coil 13 formed on the other magnetic head block 13 to be exposed to outside.

Figure 25:
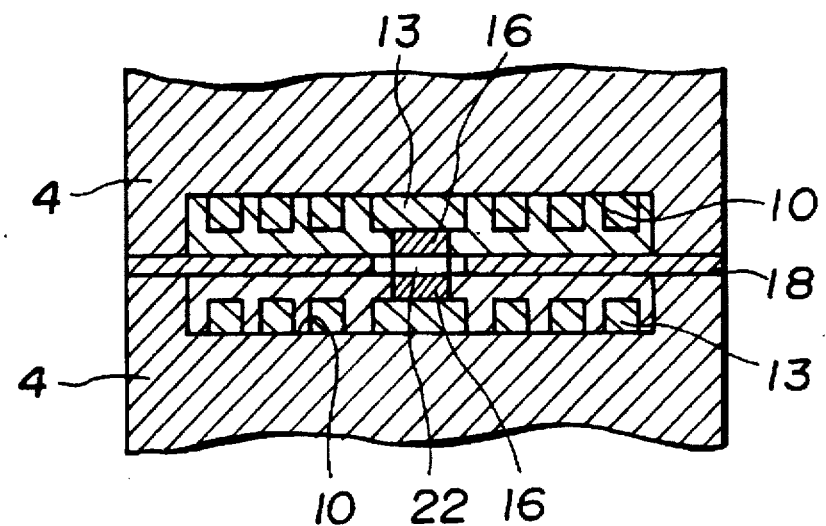

FIG. 25 shows the cross-section taken along line x—x shown in FIG. 24. The contact electrodes 16 of the coils 15 of the magnetic head blocks 23, 23 of the combined block are electrically connected to each other by an Au electrode 22.

Figure 26:
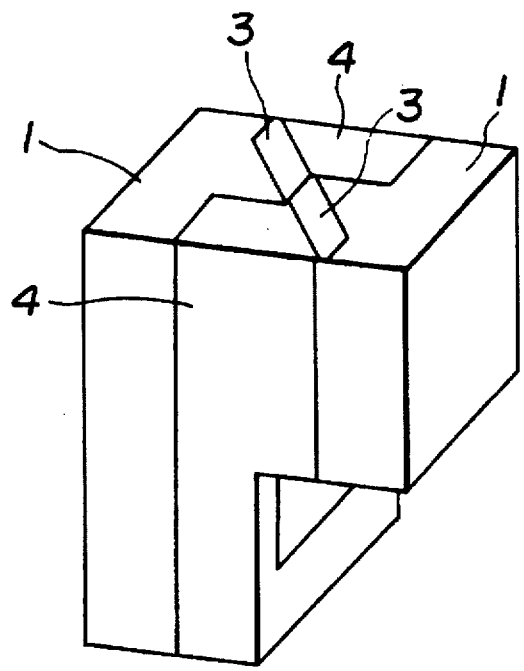

FIG. 26 shows an individual head chip 24 as sliced from the combined block by slicing (chip cutting).

In the magnetic head chip 24, the coil 13 is formed in the recesses 10 formed in the magnetic gap forming surfaces, without it being necessary to apply the winding subsequently.

Besides, since the magnetic gap forming surface is planarized by grinding after the formation of the coil 13, there is no risk of the stress or damages being left so that sufficient gap accuracy may be assured.

The method for producing each magnetic head is not limited to the above-described embodiments. For example, although the gap bonding in the above embodiment is by the glass film, it may also be by so-called gold bonding, that is bonding by gold diffusion.

The method for producing the magnetic head by the bonding by gold diffusion is hereinafter explained.

Meanwhile, since the process up to the step shown in FIG. 12 is similar to that of the previous embodiment, only the subsequent steps are explained.

In the present embodiment, the recess 10 of a shape conforming to the coil is formed on the glass 4, and subsequently a film of good electrically conducting metal film 31 and a metal film for the contact electrode 32 are formed step by step. A photoresist layer 33, patterned in accordance with the coil pattern, is formed thereon.

The film of good electrically conducting metal film 31 and a metal film for the contact electrode 32 are then etched to conform to the coil shape by ion milling, using the photoresist layer 33 as a mask, as shown in FIG. 28.

Figure 29A:
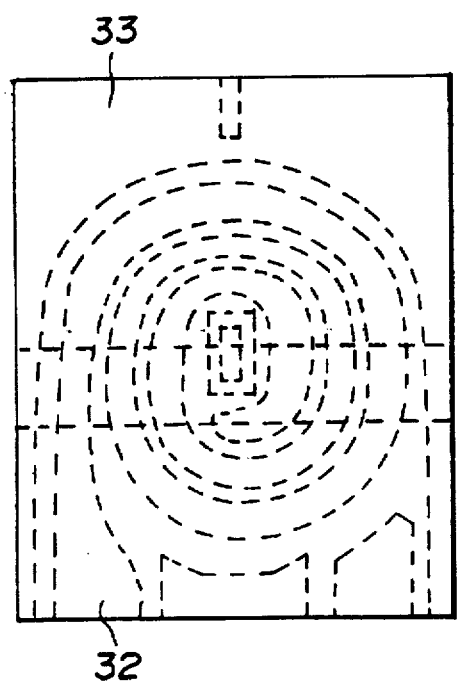
FIGS. 29A and 29B show an insulating film forming step in plan and cross-sectional views, respectively.
Figure 29B:
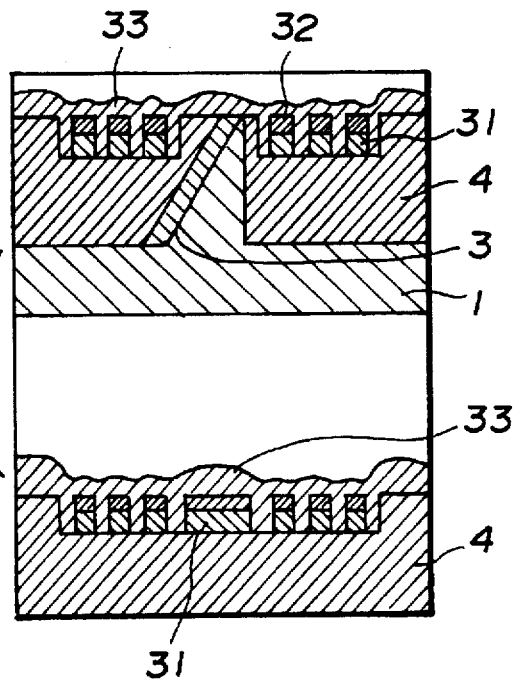
Figure 30A:
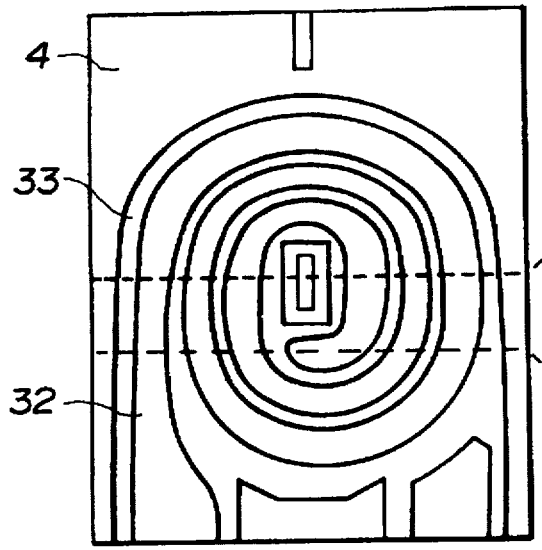
FIGS. 30A and 30B show a planarizing step in plan and cross-sectional views, respectively.
Figure 30B:
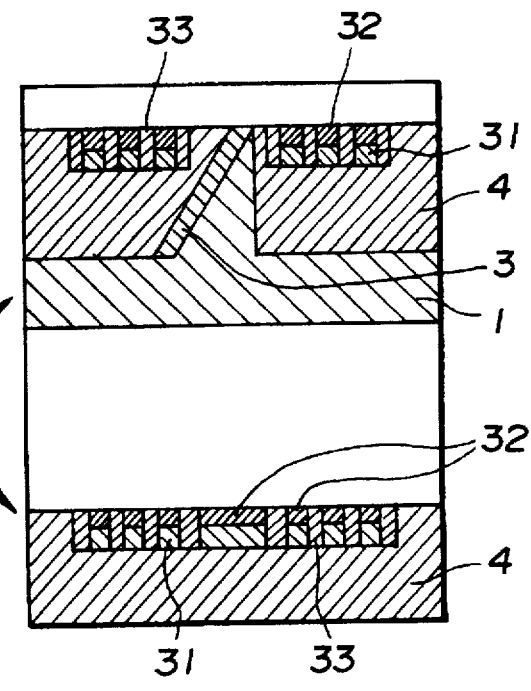

An insulating film 33 is then formed as a protective layer plugging the recess 10 as shown in FIG. 29. The substrate surface is then planarized by surface grinding, as shown in FIG. 30.

A photoresist layer 34 is then formed at the contact electrode, back gap section 3a and the peripheral area excluding the coil forming area and the glass 4 and the surface of the coil-shaped metal film 32 for the contact electrode are ion-milled to a shallow depth. In this manner, a shallow recess is formed, as shown in FIG. 32, and the coil forming area is slightly receded from the magnetic gap forming surface.

Then, as shown in FIG. 33, a non-magnetic metal film 35 for gap formation and an Au thin film 36 are formed, step by step, and a photoresist layer 37 is formed thereon to a pattern shape similar to that for the photoresist layer 34.

The non-magnetic metal film 35 and the Au metal film 36 are formed for diffusion bonding of gold. If the gap is formed by gold diffusion bonding, it suffices if a gold film is formed and bonded at the contact electrode area and the gap bond area, so that the process may be simplified. Meanwhile, if the gap is to be formed by silver diffusion bonding, the non-magnetic metal film 35 is preferably employed as an underlying layer as in the present embodiment for improving the bonding between the gap surface and gold. The materials of the non-magnetic metal film 35 include Ti, Cr, V, Al, Ta, Nb, Zr, Hf, Mo and W.

The non-magnetic metal film 35 and the Au thin film 36 are pattern-etched by ion milling or the like to a pre-set pattern, using the photoresist layer 37 as a mask, to complete a magnetic core block 38, as shown in FIG. 34.

Figure 35:
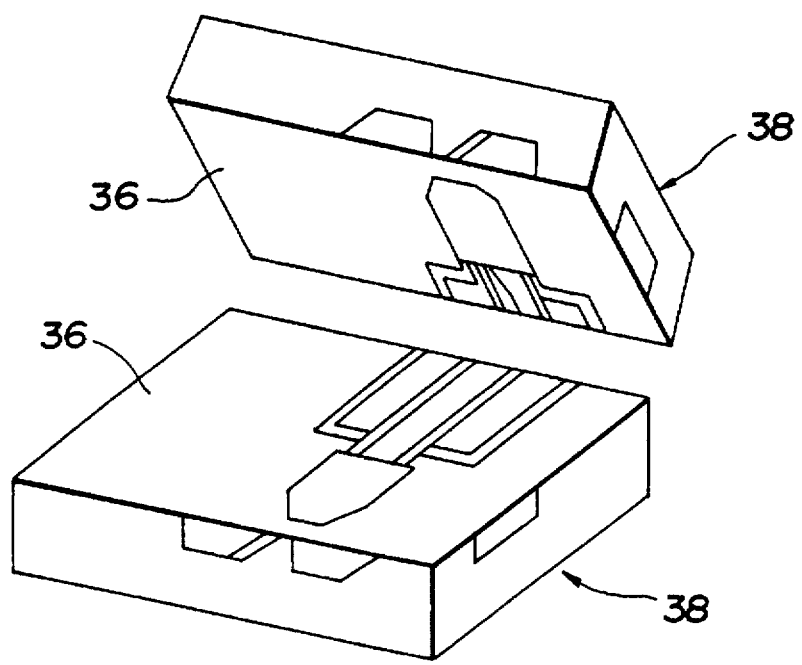
Figure 36:
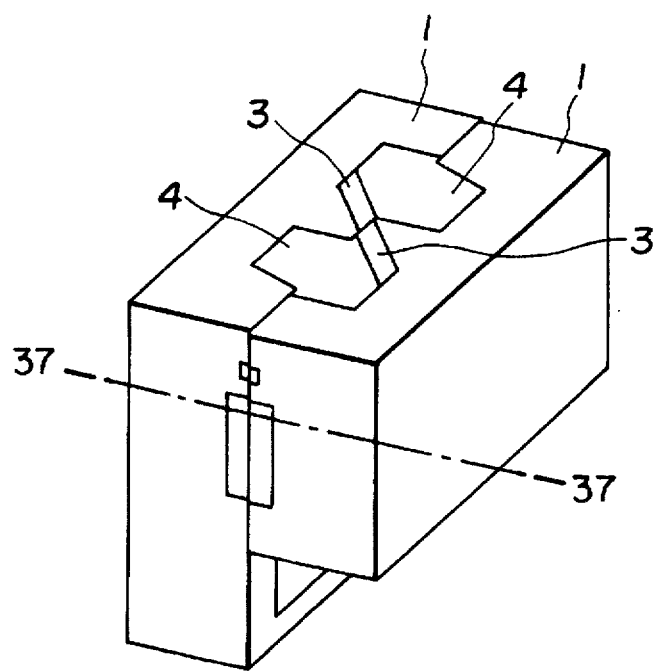
Figure 37:
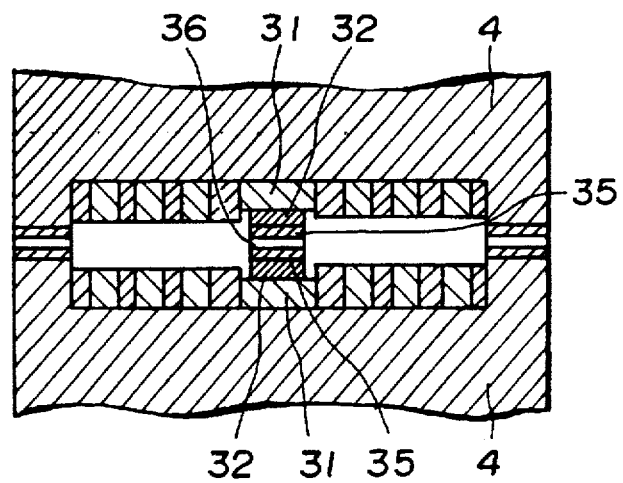

Two of the magnetic core blocks 38, 38, produced by the above-described steps, are abutted to each other, as shown in FIG. 35, and bonded under pressure to each other, as shown in FIG. 36.

By such pressure bonding, gap bonding is completed and the contact areas of the coil-shaped metal films for the contact electrodes 32 are electrically connected to each other by the non-magnetic metal film 35 and the Au thin film 36.

By the above process, a magnetic head having the thin film coil mounted therein is produced. With such magnetic head, there is no risk of coil breakage or shorting. Besides, since gap bonding is by gold diffusion, and heat treatment at elevated temperatures is unnecessary, it is possible to maintain the magnetic properties of the magnetic metal film 3.

A multi-channel head is produced using the magnetic core blocks 23 or the magnetic core blocks 38 produced as described above. The process steps for producing the multi-channel head is hereinafter explained.

The multi-channel head may be produced by a method employing magnetic core blocks of the same type, or by a method employing two different types of magnetic core blocks, namely magnetic core blocks having different directions of inclination of the magnetic metal films 3. The number of channels may also be changed as desired. The following description is made of the method for producing the two-channel magnetic head and the four-channel magnetic head, by way of illustrative examples.

Figure 38A:
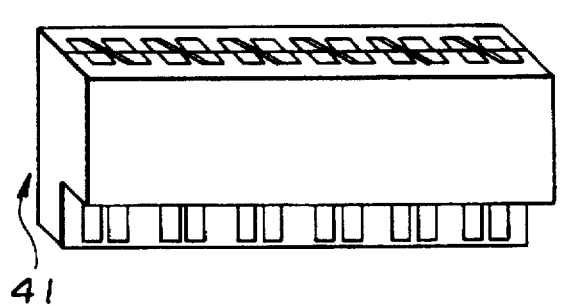
FIGS. 38A and 38B show a magnetic head block in use in schematic perspective and schematic plan views, respectively.
Figure 38B:
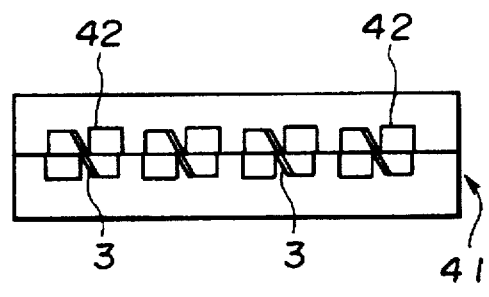

First, the method of producing the two-channel magnetic head using the magnetic core blocks of the same type is explained. Plural magnetic head blocks 41, each having plural magnetic heads 42, such as the previously described magnetic core blocks 23 or 38, are prepared, as shown in FIG. 38.

Figure 39A:
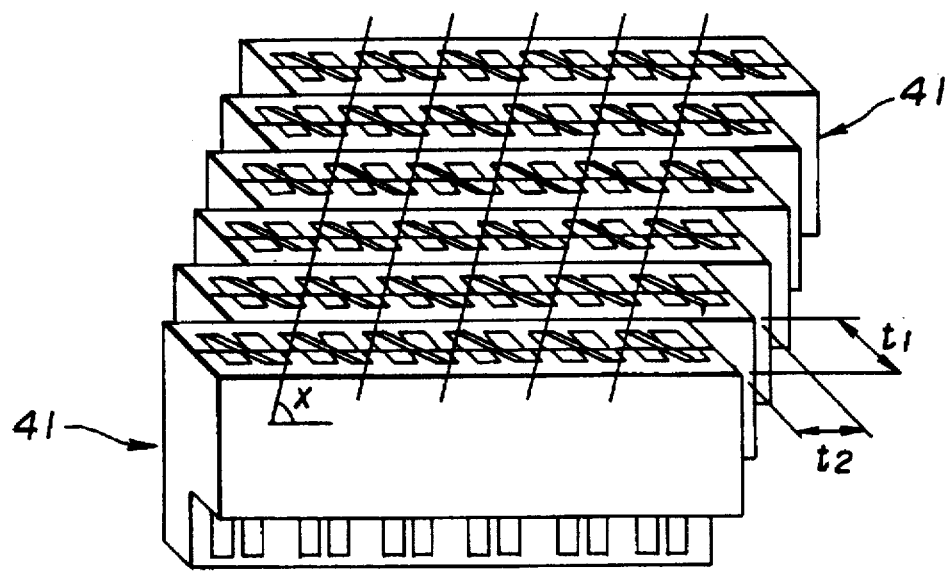
FIGS. 39A and 39B shows a magnetic head block bonding step and a magnetic head block severing step in schematic perspective and schematic plan views, respectively.
Figure 39B:
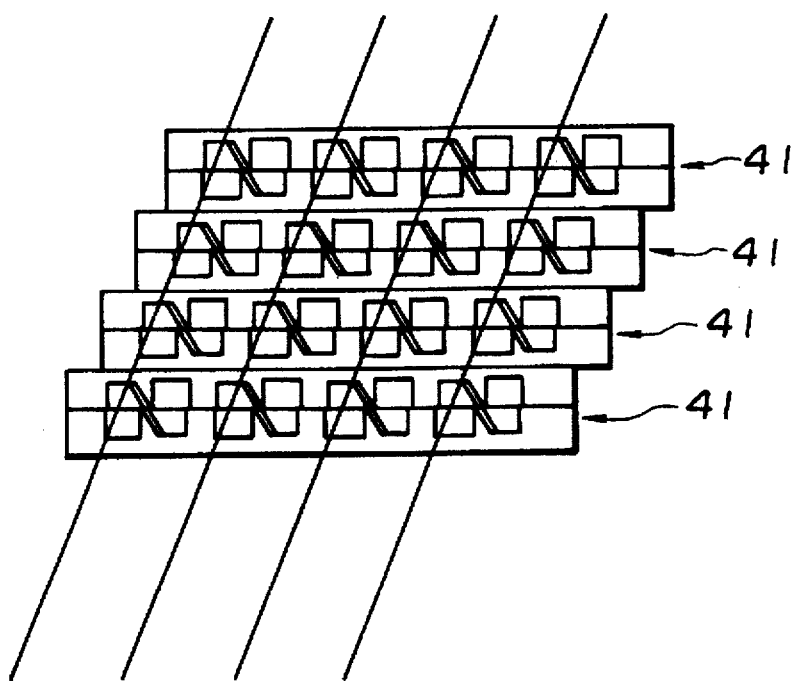
Figure 52:
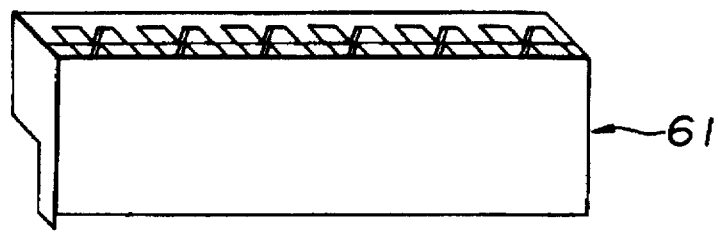
Figure 53:
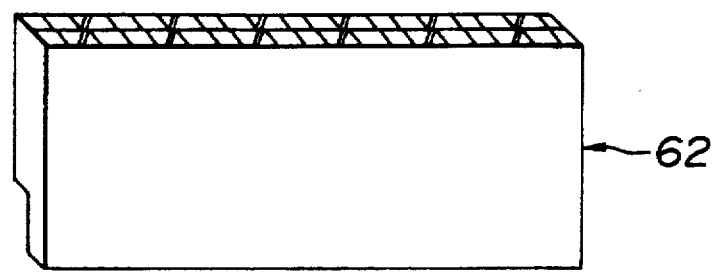
Figure 54:
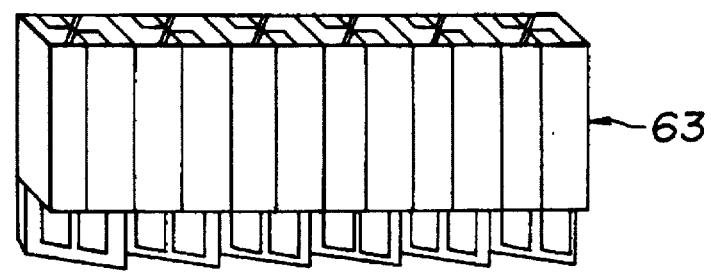
Figure 55:
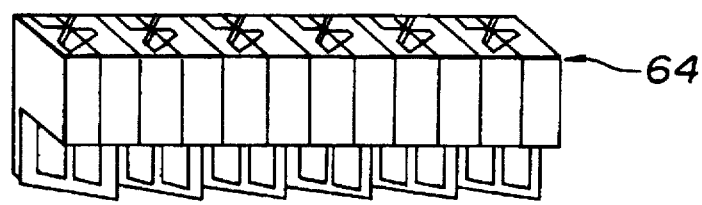

These magnetic head blocks 41 are bonded together with a shift of a pre-set pitch from one head block to another, as shown in FIG. 39. The width of the head block 41, the shifting distance and the track pitch of each magnetic head 42 are denoted as t1, t2 and t, respectively.

The magnetic head blocks 41, thus bonded together, are sliced at a pre-set angle x. The slicing angle x, the head block width t1 and the shift distance t2 are selected so that the relation tan x=t1/t2 is satisfied.

This gives a first multi-head block 43 shown in FIG. 40. With the so-produced multi-head block 43, the magnetic gap has a pre-set angle, and the track pitch t' satisfies the relation t'=t1/sin x.

The width t1 of the magnetic head block 41 and the shifting distance t2 are set so that the track pitch t' of the multi-head block 43 having the thus angled gap and the track pitch t of the magnetic head block 41 yet to be sliced is equal to each other.

As for the other magnetic head block 41, its bonding surface is ground so that the head-to-head distance is equal to a pre-set distance, as shown in FIG. 41, to give a second multi-head block 44. FIG. 42 shows the thus ground state of the multi-head block 44.

The first multi-head block 43 and the second multi-head block 44 are stacked and bonded together and the resulting unit is sliced at a pre-set angle y, as shown in FIG. 43.

FIG. 44 shows a magnetic head produced by the above process. The azimuth angles of the tracks of a finished head chip 45 are y and y -x, so that, if x and y are 40° and 20°, a two-channel magnetic head having two magnetic heads, namely a magnetic head 46 having an azimuth angle of +20° and a magnetic head 47 having an azimuth angle of −20°, may be produced.

As for the head sliding surfaces, the angle of inclination of the magnetic metal film 3 differs significantly between the magnetic heads 46 and 47.

Such problem may be resolved by employing two different types of the magnetic head blocks having different directions of inclination of the magnetic metal films 3. The method for producing the two-channel magnetic head using the two different types of the magnetic head blocks is hereinafter explained.

If the two-channel magnetic head is produced using the two different types of the magnetic head blocks having different directions of inclination of the magnetic metal films 3, it becomes possible to produce two kinds of the two-channel heads having different angles of inclination of the magnetic metal films 3 in the respective magnetic heads as viewed from the sliding surfaces.

That is, if the angle of the troughs initially formed in the substrate is 45°, the inclination of the magnetic metal film 3 relative to the gap surface when looking from the sliding surface of the magnetic head may be 45° clockwise or 45° counterclockwise, depending on the direction in which the troughs are initially formed in the substrate.

The former type of the magnetic head is produced in the following manner.

The first multi-head block 43 is prepared in accordance with the process shown in FIGS. 38 to 40, as in the case of producing a single type magnetic head block.

Then a magnetic head block 51 having the direction of inclination of the magnetic thin film 3 different from that of the magnetic head block 41 is prepared and its bonding surface is ground to give a pre-set head-to-head distance to provide a second multi-head block 52. The multi-head block 52 thus ground is shown in FIG. 46.

The first multi-head block 43 and the second multi-head block 52 are stacked and bonded to each other and sliced at a pre-set angle.

This gives a two-channel head in which the magnetic metal film 3 is inclined 45° relative to the gap surface in the counterclockwise direction when looking from the sliding surface of the head, as shown in FIG. 48.

The latter type of the magnetic head is produced in the following manner.

The second multi-head block is prepared as in the above-described example, that is, the bonding surface of the magnetic head block 51 shown in FIG. 45 is ground to produce a second magnetic head block 51 shown in FIG. 46.

Then, a plurality of the magnetic head blocks 41 are sequentially bonded to one another with a constant shift corresponding to a pre-set pitch in a shifting direction opposite to the shifting direction shown in FIG. 39. The resulting block is sliced with an inclination equal to an angle x clockwise relative to the bonding surface to produce a multi-head block 53.

The first multi-head block 43 and the second multi-head block 52 are stacked and bonded to each other and sliced at a pre-set angle, as shown in FIG. 50.

This gives a two-channel head in which the magnetic metal film 3 is inclined 45° in the clockwise direction relative to the gap surface when looking from the sliding surface of the head, as shown in FIG. 51.

The two-channel magnetic heads produced by the above-described methods have their unique features. For example, with the two-channel head shown in FIG. 44, the manufacture may be simplified because it suffices to prepare magnetic head blocks of the same type. On the other hand, with the two-channel head shown in FIG. 48, the flow of the magnetic flux of the magnetic head relative to the direction of magnetization of the magnetic recording medium is straightforward to assure a good recording efficiency, whereas, with the two-channel head shown in FIG. 51, the magnetic core may be of a larger size even with the reduced head-to-head distance.

The method of producing a four-channel head is explained.

In producing the four-channel head, two of the first multi-head blocks and two of the second multi-head blocks are prepared in accordance with the process similar to that employed for the preparation of the same type magnetic head blocks. One of the first multi-head blocks and one of the second multi-head blocks have their both sides ground depending on the head-to-head distance.

The first multi-head block 61, the second multi-head block 62, the third multi-head block 63 and the fourth multi-head block 64, prepared in this manner, are shown in FIGS. 52, 53, 54 and 55, respectively.

Figure 56:
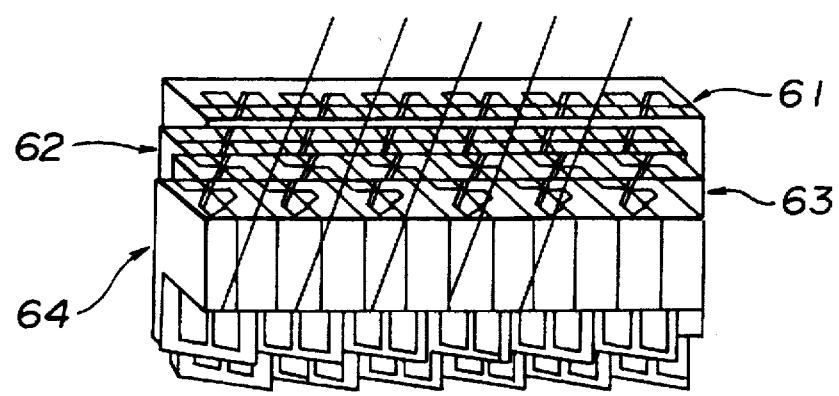
Figure 57A:
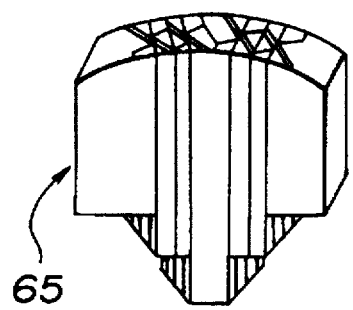
FIGS. 57A and 57B show a produced 4-channel head in schematic perspective and schematic plan views, respectively.
Figure 57B:
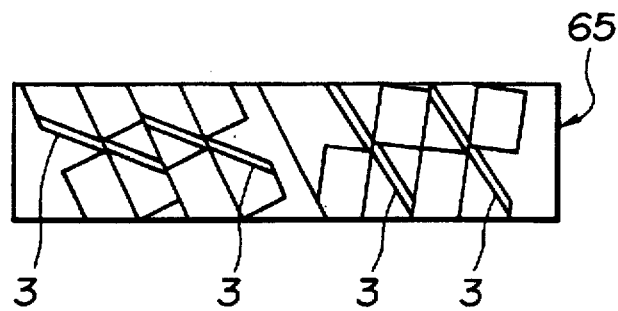

These first to fourth multi-head blocks 61 to 64 are bonded together as shown in FIG. 56 and sliced at a pre-set angle to produce a four-channel head 65 as shown in FIG. 57.

Meanwhile, the multi-channel head suffers from cross-talks between the heads if the heads are placed closer to one another. If the multi-channel head is prepared in accordance with the above-described method, it becomes possible to reduce the cross-talk by previously forming a magnetic film or a metal film on the bonding surface or to have a metal film or a magnetic foil sandwiched during bonding. It is noted that, with the use of the magnetic film or the magnetic foil, the inductance of the head is increased, although an outstanding effect in reducing the cross-talk may be achieved from the low to high frequency ranges. Besides, if the metal film or the magnetic foil is used, the inductance is not increased significantly, although the effect in reducing the cross-talk is limited to the high frequency range.

The above-described multi-channel magnetic head may be conveniently employed with a recording and/or reproducing apparatus for compressing and recording/reproducing digital picture signals. The method for compressing the recording information in a manner suffering from replay distortion to a lesser extent is hereinafter explained.

The method comprises converting the input digital picture signals into block-based data, each consisting of plural pixel data, by way of blocking, compression-coding the blocked data on the block basis, channel-coding the compression-coded data and recording the channel-coded data on the magnetic head according to the present invention as loaded on a rotary drum. The present method is hereinafter explained with reference to a recording side arrangement and a reproducing side arrangement.

Figure 59:
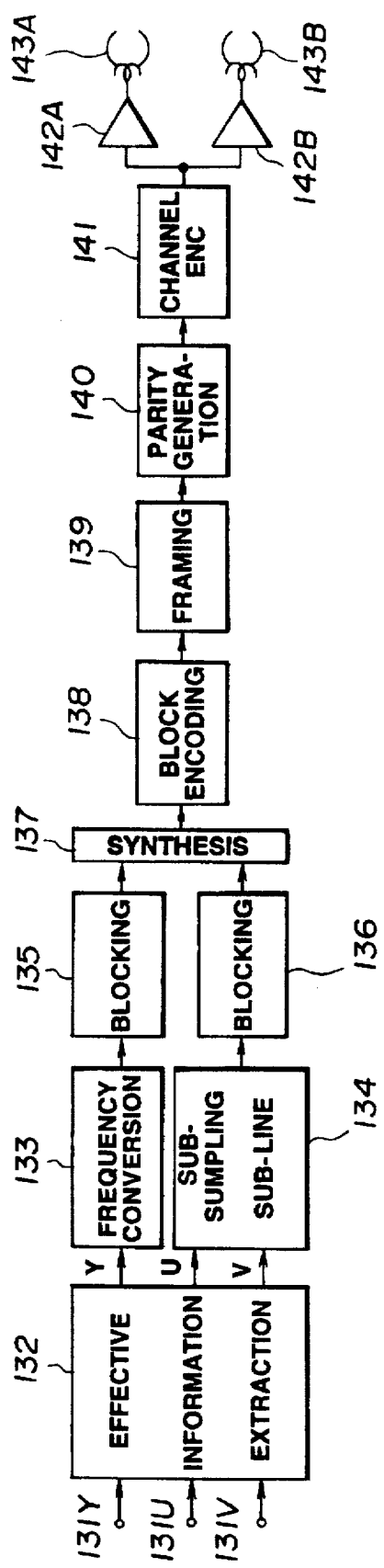
FIG. 59 is a block diagram showing the constitution of the recording side of a signal processor for compressing the digital picture information in a manner suffering from less playback distortion.

FIG. 59 shows an entire arrangement on the recording side, wherein digital luminance signals Y and digital chroma signals U and V, formed from three prime color signals R, G and B from a color video camera, for example, are routed to input terminals 131Y, 131U and 131V. The clock rates of the respective signals are selected to be equal to the frequencies of the component signals of the D1 format. That is, the respective sampling frequencies are set to 13.5 MHz and 6.75 MHz, with the number of bits per sample being eight bits. Thus the signal data quantity supplied to the input terminals 131Y, 131U and 131V becomes equal to approximately 216 Mbps. The data quantity is compressed to approximately 167 Mbps by means of an effective information extracting circuit 2 which eliminates data during the blocking period and taking only the effective range information.

Among output signals of the effective information extracting circuit 132, the luminance signals Y are routed to a frequency converting circuit 133 where the sampling frequency is changed from 13.5 MHz to a value equal to three-fourths thereof. As the frequency converting circuit 133, a sub-sampling filter, for example, is employed for eliminating the aliasing distortion. Output signals of the frequency converting circuit 133 are supplied to a blocking circuit 135 where the sequence of the luminance data is changed to the block sequence. The blocking circuit 135 is provided for a block encoding circuit 138 provided on the downstream side.

Figure 61:
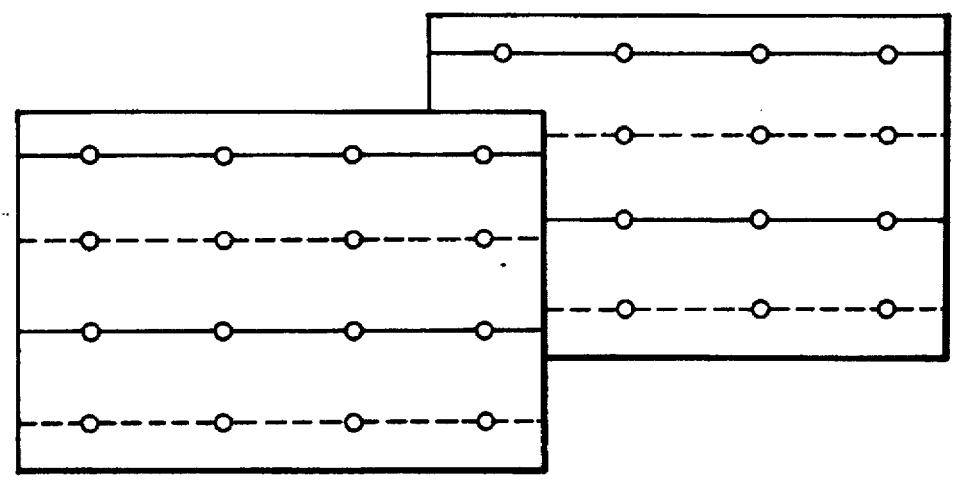
FIG. 61 is a schematic view showing a typical block for block encoding.

FIG. 61 shows the structure of a unit block for encoding. The present example is relevant to a three-dimensional block in which a picture straddling two blocks is partitioned for generating a large number of 4 line × 4 pixels × 2 frame unit blocks. In FIG. 61, solid lines and broken lines indicate odd field lines and even field lines, respectively.

Figure 62:
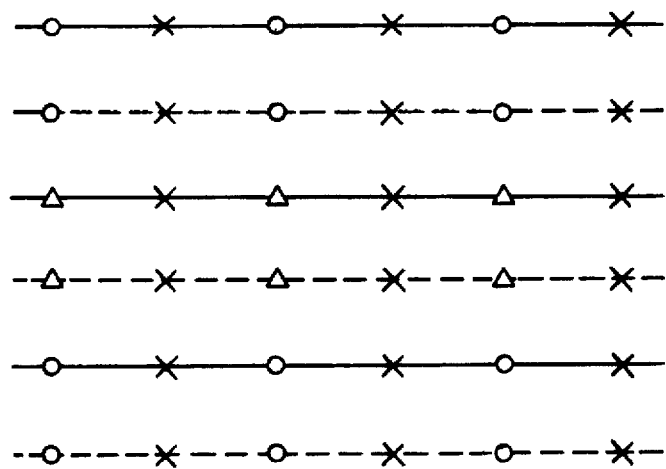
FIG. 62 is a schematic view for illustrating sub-sampling and subsidiary lines.

Of the outputs of the effective information extracting circuit, two chroma signals U and V are supplied to a sub-sampling and sub-line circuit 134 where the sampling frequency is halved from 6.75 MHz, after which the two digital chroma signals are selected for every other line so as to be synthesized to one-channel data. Consequently, line-sequentialized digital chroma signals are obtained from the sub-sampling and sub-line circuit 134. FIG. 62 shows the pixel configuration of sub-sampled and sub-lined signals from the sub-sampling and sub-line circuit 134. In FIG. 62, ●, Δ and x denote sub-sampled pixels for the first chroma signals U, sub-sampled pixels for the second chroma signals V and the positions of the pixels thinned by sub-sampling.

The line-sequential output signals of the sub-sampling and sub-line circuit 134 are supplied to a blocking circuit 136. In the blocking circuit 136, the chroma data arrayed in the sequence of scanning of television signals are converted into block sequential data, as in the above-mentioned blocking circuit 136. In the blocking circuit 136, the chroma data is converted into data of a 4 lines × 4 pixels × 2 frame block structure, as in the above-mentioned blocking circuit 135. Output signals of these blocking circuits 135 and 136 are supplied to a synthesizing circuit 137.

In the synthesizing circuit 137, the luminance signals and the chroma signals, converted into block sequence data, are converted into one-channel data. Output signals of the synthesizing circuit 137 are routed to the block encoding circuit 138. The block encoding circuit 138 may be constituted by an encoding circuit adapted to the block-based dynamic range (ADRC) and a discrete cosine transform (DCT) circuit. Output signals of the blocking circuit 138 are supplied to a framing circuit 139 where they are converted into frame-structure data. In the framing circuit 139, changeover is made between pixel-based clocks and the clocks of the recording system.

Output signals of the framing circuit 139 are routed to a parity generating circuit 140 where parity data of the error correction coding is generated. Output signals of the parity generating circuit 140 are routed to a channel encoder 141 where channel coding is executed in such a manner as to reduce the low-range portion of the recording data. Output signals of the channel encoder 141 are routed via recording amplifiers 142A and 142B and a rotary transformer, not shown, to a pair of magnetic heads 143A, 143B, so as to be recorded on a magnetic tape. Meanwhile, audio signals and video signals are separately compression-coded so as to be supplied to the channel encoder 141.

By the above processing, only the data during the effective scanning period is extracted for reducing the input, data volume of 216 Mbps to approximately 167 Mbps. The data volume is further reduced to 84 Mbps by frequency conversion and sub-sampling and sub-lining. The supplementary information, such as parity and audio signals, are subsequently added so that the recording data volume amounts to 31.56 Mbps.

Figure 60:
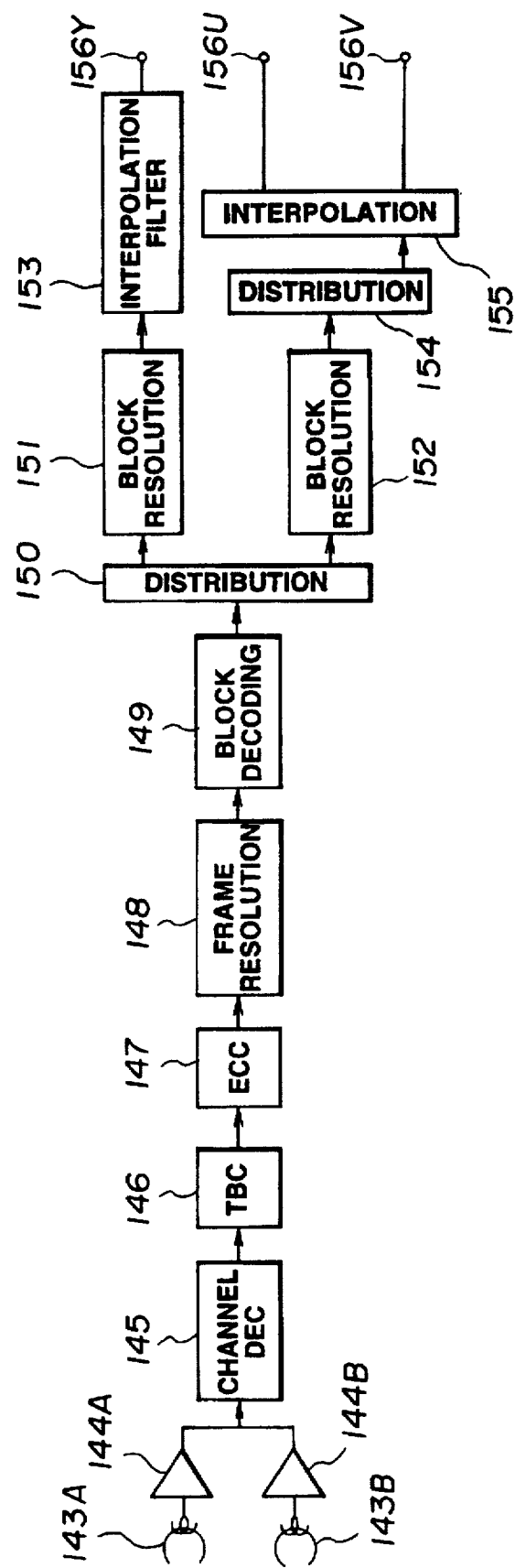
FIG. 60 is a block diagram showing the constitution of the reproducing side of a signal processor for compressing the digital picture information in a manner suffering from less playback distortion.

Referring to FIG. 60, the reproducing side arrangement is explained.

In FIG. 60, replay data from the magnetic heads 143A and 143B are routed via the rotary transformer and playback amplifiers 144A and 144B to a channel decoder 145. In the channel decoder 145, channel-coded data is demodulated. Output signals of the channel decoder 145 are supplied to a time base correction (TBC) circuit 146 where jitter components in the playback signals are removed. Playback data from the TBC circuit 146 are routed to an ECC circuit 147 where error correction and error concealment is executed using the error correction coding. Output signals of the ECC circuit 147 are routed to a frame resolution circuit 148.

In the frame resolution circuit 148, the block encoded data is separated into respective components, while the clocks of the recording system are changed over to the pixel-based clocks. The separated data from the frame resolution circuit 148 are routed to a block decoding circuit 149 where decoded data corresponding to the original data are generated on the block basis. The decoded data is routed to a distribution circuit 150. In the distribution circuit 150, the decoded data is separated into luminance signals and chroma signals. The luminance signals and chroma signals are supplied to block resolution circuits 151 and 152, where the block sequence decoded data is converted into raster scanning sequence data.

The decoded luminance signals from the block resolution circuit 151 are routed to an interpolation filter 153 where the sampling rate of the luminance signals is converted from 3 fs into 4 fs (=13.5 MHz). Digital luminance signals Y from the interpolation filter 153 are taken out at the output terminal 156Y.

On the other hand, digital chroma signals from the block resolution circuit 152 are routed to a distribution circuit 154 where the line-sequential digital chroma signals U and V are separated into digital chroma signals U and V, respectively. The digital chroma signals U and V from the distribution circuit 154 are routed to an interpolation circuit 155 for interpolation. The interpolation circuit 155 interpolates the thinned line and pixel data using restored pixel data. Thus the digital chroma signals U and V having a sampling rate of 2 fs are produced at the interpolation circuit 155 so as to be outputted at output terminals 156U and 156Y, respectively.

Meanwhile, an adaptive dynamic range encoder (ADRC) is employed as the block encoding circuit 138. The ADRC encoder detects a maximum value MAX and a minimum value MIN in the plural pixel data included in each block and detects the block-based dynamic range DR from the maximum value MAX and the minimum value MIN to effectuate the coding adapted to the dynamic range DR and re-quantization with the number of bits lesser than the number of bits used in the original pixel data. By way of another example of the block encoding circuit 138, the pixel data of each block are processed with DCT to produce DCT coefficient data which is quantized and the resulting quantized data is compression-coded by run-length Huffman coding.

Figure 63:
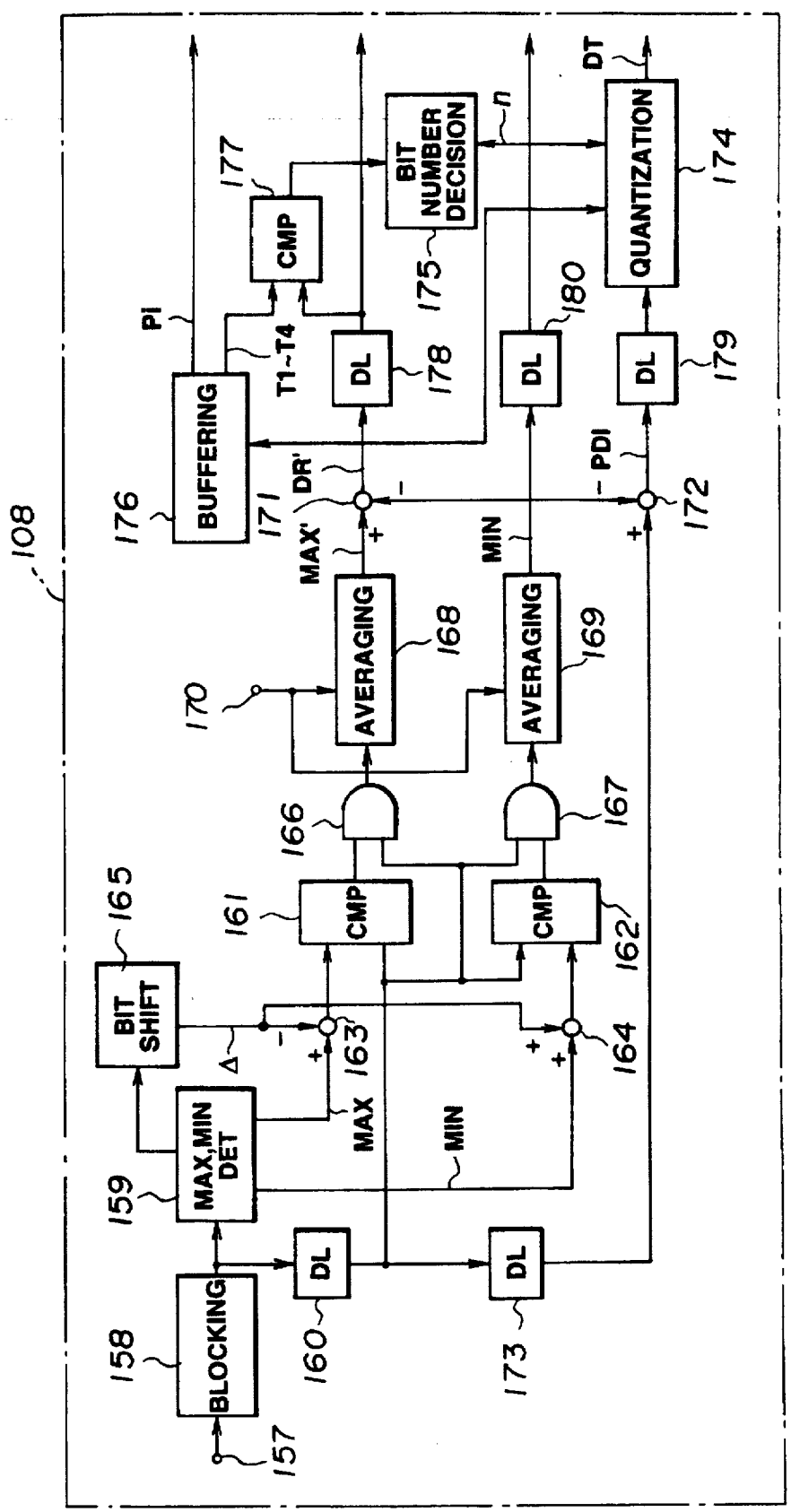
FIG. 63 is a block diagram showing a typical block encoding circuit.

Referring to FIG. 63, an example of an ADRC encoder in which deterioration in the picture quality is not produced on multiple dubbing is explained.

In FIG. 63, digital video signals or digital chroma signals, in which each sample is quantized with 8 bits, are entered from the synthesis circuit 137 of FIG. 59 to an input terminal 157. The blocked data from the input terminal 157 are routed to a maximum value and minimum value detection circuit 159 and a delay circuit 160. The maximum value and minimum value detection circuit 159 detects the minimum value MIN and the maximum value MAX on the block basis. The delay circuit 160 delays the input data by the time necessary for detecting the maximum value and minimum value. Pixel data from the delay circuit 160 are routed to a comparator circuit 161 and to a comparator circuit 162.

The maximum value MAX and the minimum value MIN from the maximum value and minimum value detection circuit 159 are routed to a subtraction circuit 163 and to an addition circuit 164, respectively. The subtraction circuit 163 and the addition circuit 164 are fed from a bit-shift circuit 165 with a quantization step width value ($\Delta=1/16$ DR) for the non-edge matching quantization with a fixed 4 bit length. The bit shift circuit 165 shifts the dynamic range DR by four bits to effect a division of 1/16. The threshold value of (MAX$-\Delta$) is obtained from the subtraction circuit 163, while a threshold value (MIN$+\Delta$) is obtained from the addition circuit 164. These threshold values from the subtraction circuit 163 and the addition circuit 164 are routed to the comparator circuits 161, 162, respectively. It is noted that the value $\Delta$ taking part in the definition of the threshold value may also be a fixed value corresponding to the noise level, instead of being a quantization step width.

Output signals of the comparator circuit 161 are routed to an AND gate 166 and output signals of the comparator circuit 162 are supplied to an AND gate 167. The AND gates 166, 167 are fed with input data from the delay circuit 160. Output signals of the comparator circuit 161 go to a high level when the input data is larger than the threshold value, so that pixel data of input data comprised within the maximum level range of (MAX$-$MAX$+\Delta$) is extracted at an output terminal of the AND gate 166. On the other hand, output signals of the comparator circuit 162 go to a high level when the input data is lesser than the threshold value, so that pixel data of input data comprised within the minimum level range of (MIN$-$MIN$+\Delta$) is extracted at an output terminal of the AND gate 167.

An output signal of the AND gate 166 is supplied to an averaging circuit 168, while an output signal of the AND gate 167 is supplied to an averaging circuit 169. These averaging circuits 168 and 169 calculate the average values on the block basis, and are fed with reset signals of a block period via a terminal 170. An average value MAX' of the pixel data comprised within the maximum level range of (MAX$-$MAX$-\Delta$) is obtained from the averaging circuit 168, while an average value MIN' of the pixel data comprised within the minimum level range of (MIN$-$MIN$+\Delta$) is obtained from the averaging circuit 169. The average value MIN' is subtracted from the average value MAX' by the subtraction circuit 171, from which a dynamic range DR' is produced.

The average value MIN' is routed to a subtraction circuit 172 and subtracted at a subtraction circuit 172 from the input data supplied from a delay circuit 173 to produce data PDI freed of the minimum value. This data PDI and the concealed dynamic range DR' are routed to a quantization circuit 174. In the present embodiment, the edge-matching quantization is executed with a variable length ADRC in which the number of bits allocated for quantization is 0, 1, 2, 3 or 4, with the coding signals not being transmitted. The number of allocated bits n is determined on the block basis in a number of bits decision circuit 175 and data with n bits is supplied to the quantization circuit 174.

With the variable length ADRC, it is possible to diminish the number of the allocated bits n for a block with a smaller dynamic range DR' and to increase the number of bits n for a block with a larger dynamic range DR' for realizing the encoding with higher encoding efficiency. With the threshold values in deciding the number of bits n being T1 to T4, where T1<T2<T3<T4, the coding signal is not transmitted, and only the information concerning the dynamic range DR' is transmitted, for the block of (DR'<T1). On the other hand, (n=1) for the block (T1$\leq$DR'<T2) and (n=2) for the block (T2$\leq$DR'<T3), while (n=3) for the block (T3$\leq$DR'<T4) and (n=4) for the block (DR'$\geq$T4).

With the above-described variable length ADRC, the volume of the generated information can be controlled by changing the threshold values T1 to T4, by way of so-called buffering. Consequently, the variable length ADRC can be applied to the transmission channel, such as a digital tape recorder of the present invention, according to which the volume of the generated information per field or frame needs to be of a pre-set value.

In the buffering circuit 46 for determining the threshold values T1 to T4 for affording a pre-set volume of the generated information, there are laid in store a plurality of sets, such as 32 sets, of the threshold values (T1, T2, T3 and T4), which sets are distinguished from one another by parametric codes Pi (i=0, 1, 2, ... 31). The volume of the generated information is adapted for being monotonously decreased as the number i of the parametric codes Pi becomes larger. However, the restored picture is deteriorated in picture quality with decrease in the volume of the generated information.

The threshold values T1 to T4 from the buffering circuit 176 are supplied to a comparator circuit 177, to which the dynamic range DR' is also supplied via a delay circuit 178. The delay circuit 178 delays the signal DR' by the time necessary for the buffering circuit 176 to establish the set of the threshold values. The comparator circuit 177 compares the dynamic range DR' of each block to each threshold value to produce a comparison output which is routed to the bit number decision circuit 175 for determining the number of allocated bits n for each block. In the quantization circuit 174, the data PDI from the delay circuit 179 freed of the minimum value is processed with the edge-matching quantization, using the dynamic range DR' and the number of allocated bits n, so as to be thereby converted into the coding signal DT. The quantization circuit 174 is constituted by, for example, a read-only memory (ROM).

The concealed dynamic range DR' and the average value MIN' are outputted via delay circuits 178, 180. Also outputted are the coding signal DT and the parametric code Pi indicating the set of the threshold values. In the present example, since the signals once quantized with the non-edge match quantization are again quantized with the edge match quantization based on the dynamic range information, the picture as dubbed undergoes deterioration only to a limited extent.

The channel encoder 141 and the channel decoder 145 are hereinafter explained.

Figure 64:
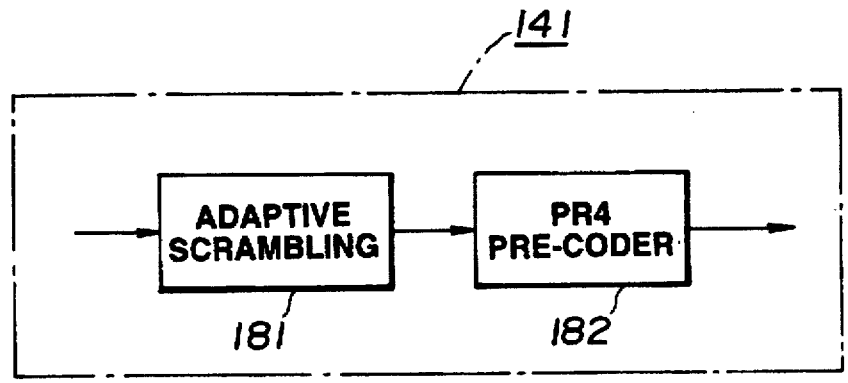
FIG. 64 is a block diagram showing a typical channel encoder.

The channel encoder 141 is an adaptive scrambling circuit fed with an output of the parity generating circuit 140, as shown in FIG. 64. Plural N-series scrambling circuits 181 are laid in store, and are adapted for selecting the N-series which will give an output containing the smallest amounts of the high frequency components and the dc components responsive to the input signals. An arithmetic operation $1/1-D^2$, where D is a unit delay circuit, is executed in a precoder 182 for the partial response class 4 detection system. An output of the pre-coder 182 is recorded/reproduced by the magnetic heads 143A and 143B via the recording amplifiers 142A and 142B, and the reproduced output is amplified by the reproducing amplifiers 144A and 144B.

Figure 65:
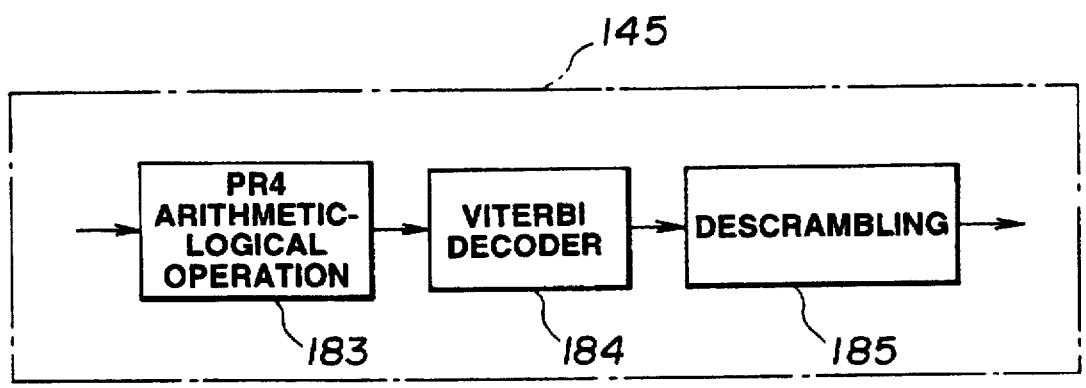
FIG. 65 is a block diagram showing a typical channel encoder.

In the channel decoder 15, an arithmetic operation of (1+D) is executed on an output of the reproducing amplifiers 144A and 144B by a partial response class 4 reproducing side arithmetic-logical circuit 183, as shown in FIG. 65. In a so-called bit-by-bit decoding circuit 184, data decoding strong against noise is executed on an output of the arithmetic-logical circuit 183 by an arithmetic-logical operation employing data correlation and plausibility. An output of the bit-by-bit decoding circuit 184 is supplied to a descrambling circuit 185 where data re-arrayed by the scrambling circuit at the recording side is restored to the original series for restoring the original data. By the decoding circuit 184, employed in the present embodiment, the playback C/N value may be improved by 3 dB as compared to the case in which decoding is performed on the bit basis.

Figure 58:
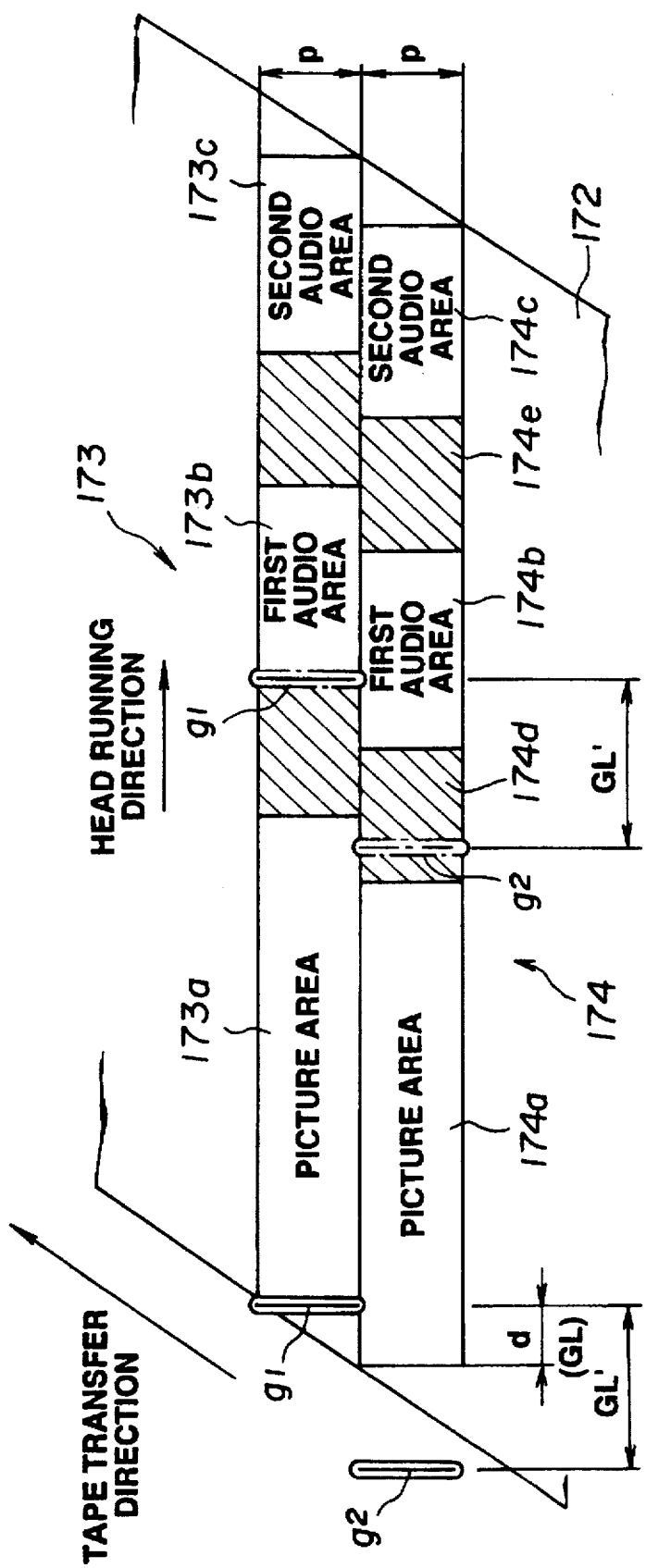
FIG. 58 shows a tape format of a magnetic tape on which the digital picture information and the audio information are recorded.

The two-channel head, fabricated as described above, is mounted on a rotating drum of a VTR which is then run in rotation for scanning for making recording on the magnetic tape 172. The recording pattern shown in FIG. 58 is then formed by the magnetic heads 170, 171 on the magnetic tape 72 which is fed by a relative movement along the peripheral surface of the rotating drum. That is, the recording track 173 on the magnetic tape 172 recorded by a previous magnetic gap $g_2$ is overwritten by a recording track 174 recorded by the next following magnetic gap $g_1$, as a result of which recording is made with a track pitch P=5 µm, as shown in FIG. 58.

Besides, the recording tracks 173, 174 recorded on the magnetic tape 172 by the magnetic heads 170, 171 are simultaneously recorded with a step difference d equal to the step difference GL between the magnetic gaps $g_1$ and $g_2$ in the head running direction. Consequently, these magnetic gaps $g_1$ and $g_2$ simultaneously reach the ends of picture areas 173a, 173b, the ends of first audio areas 173b, 174b or the ends of the second audio areas 173c, 174c on the respective recording tracks 173, 174. As a result thereof, post-recording of audio signals may be achieved satisfactorily without affecting other recorded signals.

It is noted that post-recording may be achieved satisfactorily without it being necessary to coincide the step difference GL between the magnetic gaps $g_1$ and $g_2$ along the head running direction. For example, if, when the preceding magnetic gap $g_1$ reaches the first audio area 173b, the other magnetic gap $g_2$ is in an inter-gap area 174d free of recorded audio or picture signals intermediate between the picture area 174a and the first audio area 174b, that is if the step difference between the magnetic gaps $g_1$ and $g_2$ is set to GL' as shown in FIG. 58, and audio signals start to be recorded in such condition, the picture may be prevented from being disturbed by the post-recording of the audio signals. Similarly, if, when the magnetic gap $g_1$ reaches the second audio area 173c, the other magnetic gap $g_2$ is in an inter-gal area 174e between the first audio area 174b and the second audio area 174c, post-recording may be achieved satisfactorily.

Besides, since the recording/reproduction is achieved simultaneously by the two magnetic gaps $g_1$ and $g_2$ simultaneously, the magnetic tape 172 having the tape width of not larger than 8 mm may be recorded/reproduced with a high recording density of not less than $8 \times 10^5$ bits/mm$^2$ for realization of recording/playback over a prolonged time without raising the bit error rate due to unusual track patterns.

If it is assumed that two magnetic heads having respective different azimuth angle orientations are mounted on the rotary head at diametrically opposite positions, and the magnetic tape 172 having a tape width of 8 mm is similarly recorded/reproduced with a high recording density of not lower than $8 \times 10^5$ bits/mm$^2$, an unusual track pattern in which the track recorded by the preceding magnetic head is partially overlapped with the track recorded by the trailing magnetic head arranged diametrically oppositely to the preceding magnetic head is produced by e.g. eccentricities of the rotating drum. The result is that the signals recorded by the previous magnetic head are partially erased and a sufficient playback output cannot be produced, while the bit error rate is raised significantly.

However, since the magnetic gaps $g_1$ and $g_2$ are arrayed at pre-set relative positions with the above-described two-channel head, the recording tracks 173, 174 recorded by the magnetic gaps $g_1$ and $g_2$ are inclined in the same direction despite the eccentricities of the rotating drum or the like so that there is no risk of the overlapping of the recording tracks. As a result thereof, a sufficient playback output may be obtained without increasing the bit error rate.

What is claimed is:

1. A maagnetic head in which a pair of magnetic core halves, each having a magnetic metal film formed in the vicinity of at least a substrate surface facing a magnetic recording medium are abutted to each other for defining a magnetic gap between the magnetic metal films, characterized in that said two metal films are arranged in approximately the same plan in edge-to-edge relationship, the width of a track recorded or reproduced by said magnetic head being defined approximately by the thickness of said magnetic metal film, and a single recess for a coil formed in the abutting surface of one of the magnetic core halves with a layer of glass formed in said recess and said layer of glass having a single recess formed therein, and a coil formed by a thin film forming technique arranged coiled flat in a plan perpendicular to the track within said recess in said layer of glass.

2. The magnetic head as claimed in claim 1 wherein recesses for coils are formed in abutting surfaces of both of said magnetic core halves and coils are arranged within the recess in the glass layer of each of said recesses.

3. The magnetic head as claimed in claim 1 wherein an insulating film is formed overlying the coil and the recess.

4. The magnetic head as claimed in claim 1 wherein the coil is a monolayer coil.

5. The magnetic head as claimed in claim 1 wherein the coil is a multilayer coil.

6. The magnetic head as claimed in claim 1 wherein track width delimiting troughs are formed on both sides of the magnetic gap.

7. The magnetic head as claimed in claim 1 wherein the magnetic metal films are arranged obliquely in continuation to each other on both sides of the magnetic gap.

8. The magnetic head as claimed in claim 2 wherein the coils provided in the magnetic core halves include contact electrodes for establishing the electrical connection.

9. The magnetic head as claimed in claim 8 wherein the contact electrodes are formed of at least one of Ti, Cr, Mo, W, Nb and Ta.

10. The magnetic head as claimed in claim 8 wherein the coils and the recesses are covered by an insulating film except the contact electrodes of the coils.

11. The magnetic head as claimed in claim 9 wherein gold films are formed on opposite surfaces of the contact electrodes and wherein the contact electrodes are connected to each other by bonding by gold diffusion.

12. The magnetic head as claimed in claim 1 wherein the magnetic gap is formed by bonding by gold diffusion.

13. A multi-channel magnetic head comprising a plurality of magnetic heads having different azimuth angles of the magnetic gaps, wherein each magnetic head is formed by abutting a pair of magnetic core halves to each other, each of said magnetic core halves having a magnetic metal film formed in the vicinity of at least a substrate surface facing a magnetic recording medium, for defining a magnetic gap between said magnetic metal films, said films being arranged in approximately the same plane in edge-to-edge relationship to define said magnetic gap with the thickness of said magnetic films approximately defining the track width and wherein a single recess for holding a coil therein formed in the abutting surface of one of the magnetic core halves with a glass layer formed in said recess and a single recess formed in said glass layer, and a coil formed by a thin film forming technique arranged in a plane perpendicular to the magnetic recording medium located in said single recess in said layer of glass.

14. The multi-channel magnetic head as claimed in claim 13 wherein recesses for coils are formed in abutting surfaces of both of said magnetic core halves and coils are arranged within the recess on the glass layer in each of said recesses.

15. The multi-channel magnetic head as claimed in claim 13 wherein a plurality of magnetic heads having different azimuth angles of the magnetic gaps are bonded integrally to one another.

16. The multi-channel magnetic head as claimed in claim 15 wherein magnetic gaps of a pair of magnetic heads are shifted relative to each other with a step difference substantially equal to the track pitch on the magnetic recording medium in the track pitch direction and are of a gap-to-gap distance in the magnetic head running direction which is shorter than the sum of the length of an inter-block gap area arranged between a picture signal area and an audio signal area and a track-to-track step difference.

17. The multi-channel magnetic head as claimed in claim 15 wherein the head is a magnetic head for digital recording in which input digital picture signals are converted into block-based data comprising plural pixel data and blocked, the resulting blocked data are compression coded on the block basis, the resulting compression coded data is channel-coded, and wherein the channel-coded data is recorded on a magnetic recording medium.

18. The multi-channel magnetic head as claimed in claim 13 wherein an electrode leadout surface of each magnetic head is directed outwards.

19. The multi-channel magnetic head as claimed in claim 13 wherein the electrode leadout position of each magnetic head is different in the depth direction of the magnetic gap.

* * * * *